(12) United States Patent
Gurivireddy et al.

(10) Patent No.: US 7,283,496 B2
(45) Date of Patent: Oct. 16, 2007

(54) NETWORK PAGING SYSTEM AND METHOD

(75) Inventors: Sridhar Gurivireddy, Richardson, TX (US); Behcet Sarikaya, Plano, TX (US); Vinod Kumar Choyi, Plano, TX (US); Xiaofeng Xu, Plano, TX (US)

(73) Assignee: Alcatel Lucent, Paris (FR)

( * ) Notice: Subject to any disclaimer, the term of this patent is extended or adjusted under 35 U.S.C. 154(b) by 971 days.

(21) Appl. No.: 10/056,960

(22) Filed: Jan. 25, 2002

(65) Prior Publication Data

US 2003/0076814 A1    Apr. 24, 2003

Related U.S. Application Data

(60) Provisional application No. 60/329,934, filed on Oct. 17, 2001.

(51) Int. Cl.
*H04Q 7/00* (2006.01)
*H04Q 7/20* (2006.01)

(52) U.S. Cl. .................. 370/331; 370/338; 455/436

(58) Field of Classification Search ............ None
See application file for complete search history.

(56) References Cited

U.S. PATENT DOCUMENTS

| | | | | |
|---|---|---|---|---|
| 5,590,133 | A * | 12/1996 | Billstrom et al. | 370/349 |
| 2002/0046287 | A1 * | 4/2002 | La Porta et al. | 709/230 |
| 2003/0143999 | A1 * | 7/2003 | Funato et al. | 455/435 |
| 2004/0213181 | A1 * | 10/2004 | Grech et al. | 370/331 |

OTHER PUBLICATIONS

S. Gurivireddy, Layer-2 aided mobility independent dormant host alerting protocol, Sep. 2001 Internet draft, pp. 1-16.*
J. Kempf, C. Castelluccia, P. Mutaf, N. Nakajima, Y. Ohba, R. Ramjee, Y. Saifullah, B. Sarikaya, X. Xu; "Requirements and Functional Architecture for an IP Host Alerting Protocol", Aug. 2001 [15 pages].

(Continued)

*Primary Examiner*—Steven H. D. Nguyen
(74) *Attorney, Agent, or Firm*—Bobby D. Slaton

(57) ABSTRACT

A network paging system and method implementing a Mobile IP protocol that allows transparent routing of IP datagrams sent by a Correspondent Node (CN) (any Internet node that wants to communicate with a Mobile Node) to a Mobile Node (MN) in the Internet is disclosed. The IP paging protocol disclosed is an extension to Mobile IP to allow dormant mode operation permitting conservation of battery power when not receiving/sending IP datagrams. The disclosed technique permits a mobile node to alternate between dormant and active modes to conserve its power resources. In the disclosed invention, the mobile node does not perform location updates as long as it is in dormant mode. In a preferred embodiment, the implement IP paging protocol is a Layer-3 protocol used to find the paging area, in which the MN is located and to alert MN to come out of dormant mode, whenever there is an incoming traffic. The present invention in some preferred embodiments defines a new paging protocol, which uses triggers from Layer-2 to gracefully bring down the Layer-3 interface. The disclosed IP paging protocol benefits from a link layer (Layer-2 or L2) triggers, which provide timely information to network layer (Layer-3 or L3) about the progress of events in Layer-2.

4 Claims, 24 Drawing Sheets

OTHER PUBLICATIONS

J. Kempf, "Dormant Mode Host Alerting ("IP Paging") Problem Statement", Jun. 2001 [13 pages].

IEEE, Guidelines for 64-Bit Global Identifier (EUI-64) Registration Authority, May 31, 2001 [7 pages].

James Kempf, Daichi Funato, Karim El Malki, Youngjune Gwon, Mattias Pettersson, Phil Roberts, Hesham Soliman, Atsushi Takeshita, Alper Yegin, "Requirements for Layer 2 Protocols to Support Optimized Handover for IP Mobility", Jul. 2001 [12 pages].

* cited by examiner

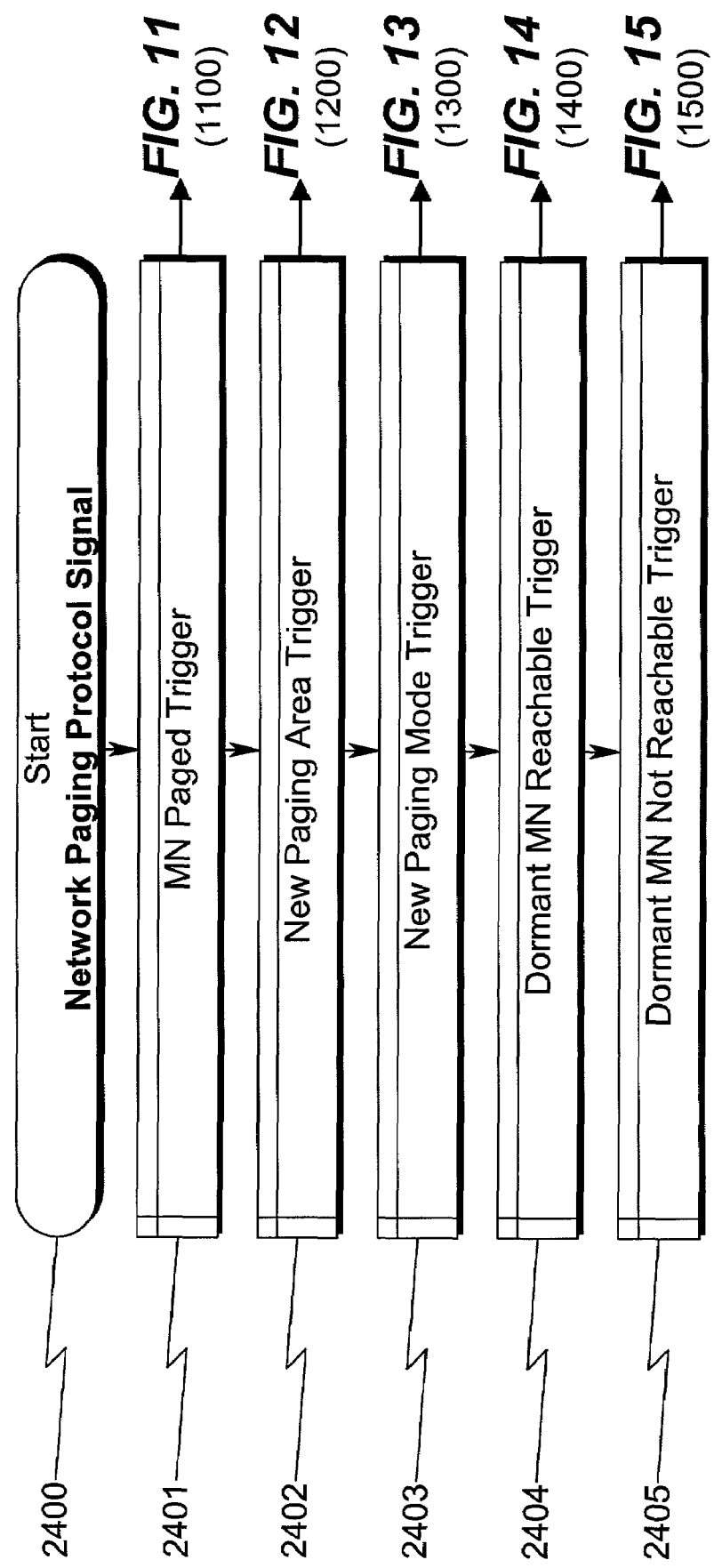

NETWORK PAGING SYSTEM AND METHOD

CROSS REFERENCE TO RELATED APPLICATIONS

Provisional Patent Applications

Applicants claim benefit pursuant to 35 U.S.C. § 119 and hereby incorporates by reference Provisional Patent Application for "Layer-2 API FOR PAGING", S/No. 60/329,934, filed Oct. 17, 2001.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

Overview

Mobile IP defines a protocol that allows transparent routing of IP datagrams sent by a Correspondent Node (CN) (any Internet node that wants to communicate with a Mobile Node) to a Mobile Node (MN) in the Internet. The present invention discloses an IP paging protocol that is an extension to Mobile IP to allow dormant mode operation, i.e. save battery when not receiving/sending IP datagrams.

Present Invention Summary

Within the context of the present invention, the Mobile Node alternates between dormant and active modes to conserve its power. The Mobile Node does not perform location updates as long as it is in dormant mode. The disclosed IP paging protocol is a Layer-3 protocol used to find the paging area, in which the MN is located and to alert MN to come out of dormant mode, whenever there is an incoming traffic.

The present invention IP paging protocol benefits from a link layer (Layer-2 or L2) operation if the link layer (Layer-2 or L2) could provide timely information to network layer (Layer-3 or L3) about the progress of events in Layer-2. Layer-2 can pass information to Layer-3 using triggers. Triggers and their associated application programming interface (API) defined in this patent can be used in the implementations of IETF's IP paging protocol to permit gracefully bringing down Layer-3 interface of the MN. In this document, triggers are defined as callback functions in C-language within the context of Application Programming Interface (API). However, they may be implemented in a wide variety of other software mechanisms.

BACKGROUND AND DESCRIPTION OF THE PRIOR ART

No existing documents/proposals define paging triggers or any associated API. Triggers related to handoff have been discussed in some prior art but this is not germane to the particular problem of providing paging triggers targeting energy conservation in mobile nodes.

DEFICIENCIES IN THE PRIOR ART

There are no existing proposals, which define triggers and the associated APIs (C-language or otherwise) for IP paging.

Considering the L2 triggers for handoff that appeared in some recent Internet drafts, the motivations behind defining paging triggers and handoff triggers are different. Layer-3 handoff and context transfer protocols use handoff triggers to reduce latency in configuring a new interface for the mobile node at the new access point. Paging triggers can be used to gracefully bring down Layer-3 configuration of MN and to detect the movement of MN in dormant mode to another subnet.

OBJECTIVES OF THE INVENTION

Accordingly, the objectives of the present invention are (among others) to circumvent the deficiencies in the prior art and affect the following:

(1) To permit upper software layers to be notified of significant events that occur at L2 protocol layers.
(2) To conserve energy resources at the MN.
(3) To permit integration of a wide variety of L2/L3 interfaces and extensions without the need for continuous monitoring of the MN, thus permitting a reduction of MN polling.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The events in Layer-2 are notified to upper layers through triggers. Some preferred invention embodiments implement triggers related to IP paging and defines them in the form of an application programming interface (API). Any new IP paging protocol to be standardized by IETF and the potential implementations of IP paging protocol will benefit from the API defined in this document. Basic uses of defining paging API can be listed as follows. The entities Mobile Node (0140) and Access Router (0120) are as indicated as illustrated in FIG. 1 (0100).

Exemplary Advantages

While not limiting the scope of the present invention, the teachings of the present invention can in some instances permit the Mobile Node to use these triggers to Prepare for configuring Layer-3 interface when mobile node comes out of dormant mode.

Gracefully bring down L3 configuration of MN when it switches to dormant mode

Detect that current L3 configuration at MN may possibly be invalid. This includes detecting the movement of MN to a different subnet in idle mode.

Additionally, Access Routers can possibly use these triggers to

Detect the change in status of connection of MN (dormant/active/Inactive)

Determine if the MN is reachable {i.e. not in Inactive mode}

Communicate among themselves to quickly reconfigure MN, when it comes out of dormant mode Software Trigger Implementations One skilled in the art will recognize that there are a wide variety of software methods to implement software triggers. As such, this document doesn't discuss the ways of implementation of paging triggers. Typically, they may be implemented by callback functions (or) interrupts (or) an application layer protocol. Whenever the mobile node decides to enter sleep mode (dormant mode) (or) whenever the MN is a paged, Layer-2 can pass the information to Layer-3 using the triggers, defined in this document. Layer-3 can use this information to prepare for disconnection from existing Layer-3 interface (or) to prepare for configuring a new Layer-3 interface as soon as MN comes out of dormant mode.

BRIEF DESCRIPTION OF THE DRAWINGS

For a fuller understanding of the advantages provided by the invention, reference should be made to the following detailed description together with the accompanying drawings wherein:

FIG. 24 illustrates a generic overview of the signaling methodology and encoding possible with the teachings of the present invention.

DESCRIPTION OF THE PRESENTLY PREFERRED EXEMPLARY EMBODIMENTS

Figure 1:
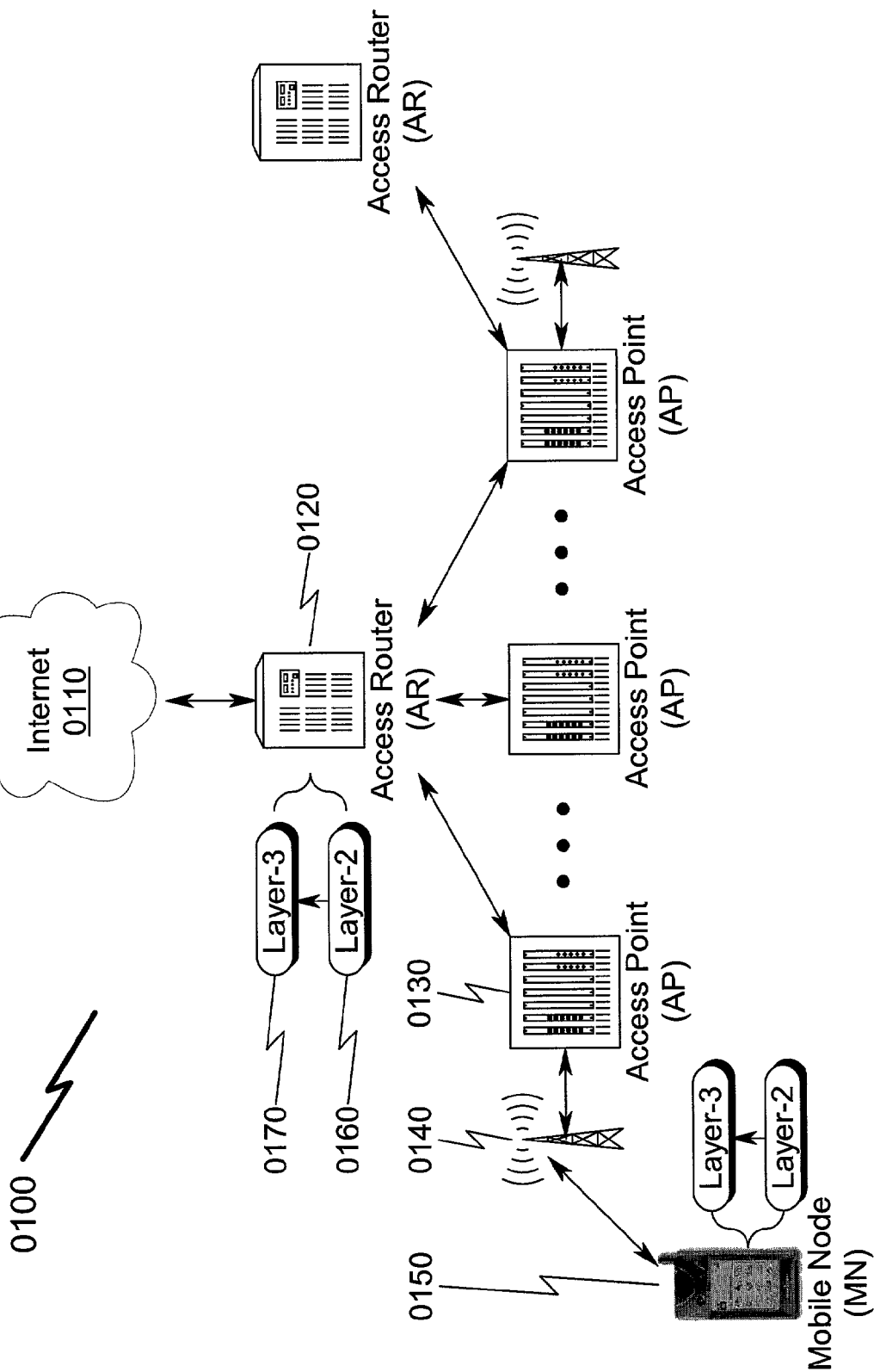
FIGS. 1-5 illustrate typical system configurations and data flows between network elements implementing the teachings of the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a NETWORK PAGING SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Definitions

Throughout the discussion in this document the following definitions will be utilized:

System Blocks/Procedural Steps Not Limitive

The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Triggers May Be Asynchronous

The asynchronous nature of the paging protocols illustrated herein should be understood to support asynchronous notification, paging, and/or triggering of events. Thus, while the exemplary API and illustrative flowcharts are sequential, there is nothing in the present invention that makes this a requirement for operation or implementation. Therefore, in the most general sense the triggering mechanisms illustrated herein should be thought of as asynchronous.

Personal Computer Not Limitive

Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications.

Internet/Intranet Not Limitive

Throughout the discussion herein the terms Internet and Intranet will be used generally to denote any network communication system or environment. Generally the term Intranet will denote communications that are local to a given system or user, and Internet will describe communications in a more distant local. One skilled in the art will recognize that these terms are arbitrary within the contexts of modern communication networks and in no way limitive of the scope of the present invention.

The present invention specifically anticipates that in some implementations the GUI development framework (and/or its runtime component) will communicate with the data used to drive the GUI over the Internet. Thus, the application driving the user interface may reside on one computer system and the data used for presentation and control may be contained somewhere else on another computer system and be accessed via any number of networking protocols.

Application Programming Interface (API) Not Limitive

While the present invention may be in part implemented using standard Application Programming Interfaces (APIs) such as Software Development Kits (SDKs) and the like, there is no requirement that the present invention be implemented using these tools. Note also that the framework of the present invention may be incorporated into standard toolkits and the like which may or may not be integrated into an API framework for use in standard software development frameworks.

Operating System Not Limitive

Additionally, while the present invention may be implemented to advantage using a variety of Microsoft® operating systems (including a variety of Windows™ variants), nothing should be construed to limit the scope of the invention to these particular software components. In particular, the system and method as taught herein may be widely implemented in a variety of systems, some of which may incorporate a graphical user interface. Some examples of these include HP-UX™, LINUX™, SOLARIS, and UNIX™ (and its variants), among others.

Data Structures Not Limitive

The present invention may be embodied in a variety of data structures in some preferred embodiments. However, the form of such data structures as described herein is only exemplary. One skilled in the art would quickly realize that a wide variety of other data structures could be used equivalently in this application. Therefore, no data structure contained herein should be interpreted as limiting the scope of the present invention.

Communication Media Not Limitive

The present invention may be embodied to affect transport of network protocol information over a variety of communication media. However, the signal format used to transmit such transmissions as described herein is only exemplary. One skilled in the art would quickly realize that a wide variety of other communication media could be used equivalently in this application. Therefore, no communication media contained herein should be interpreted as limiting the scope of the present invention.

Triggers Not Limitive

The present invention may be embodied to affect trigger implementations using a wide variety of software methods. However, the particular method used to affect these triggers as described herein is only exemplary. One skilled in the art would quickly realize that a wide variety of other software methods could be used equivalently in this application. Therefore, no trigger methodology contained herein should be interpreted as limiting the scope of the present invention.

Acronyms

The following acronyms will be used throughout the discussion of the present invention and in discussions contrasting it with the prior art:

Paging Area
  The network may be divided into a set of areas called L2 paging areas. As long as MN moves within a single paging area, it need not perform location updates. The paging area refers to a Layer-2 paging area as defined in the cellular systems of GPRS (or) UMTS standards.

Paging Agent
  A node which distributes paging requests to MN upon the receipt of an incoming call New Paging Area
  The Layer-2 paging area into which MN has just moved Paging Request
  Layer-2 message used to notify MN that there is an incoming call.

Access Router (AR)
  The node with which MN has registered its Layer-3 binding. Here AR is a generic term used to refer to "Access Router" in Mobile IPv6 and "Foreign Agent" in Mobile IPv4.

Layer-3
  In the document Layer-3 refers to the network layer in the OSI stack and does not refer to Layer-3 in 2.5 G/3G terminology.

Layer-2 Assumptions

The present invention makes the following assumptions regarding the underlying Layer-2 architecture:
  Paging and dormant mode is totally controlled by Layer-2, i.e., the network (IP) layer neither has any control over dormant mode nor it can page the MN without using the Layer-2 paging.
  Multiple paging areas are part of single IP subnet.
  Network supports micro-mobility. Inter-AR handoff is possible in visited network. The Access Router is pushed down to SGSN (as in 3G networks).

Generalized System Architecture (0100)

A generalized invention system architecture incorporating these assumptions is illustrated in FIG. 1 (0100). In this system context, the Internet (0110) or some other communication medium is used to communicate with a Mobile Node (MN) (0150) via intermediary Access Routers (0120), Access Points (AP) (0130), and/or wireless communication media (0140).

Introduction

A preferred invention embodiment incorporating link layer (L2 or Layer-2) API for paging specifies the services (related to paging), provided by Layer-2 to Layer-3 in mobility networks. Layer-2 can serve upper layers by sending triggers to them during Layer-2 paging events. Possible events in Layer-2 are early notice of an upcoming change in the dormant mode status of mobile node or the change in paging area of mobile node. A preferred invention embodiment defines an API for the services related to dormant mode provided by Layer-2. Defining a Layer-2 API for paging helps in writing standard Layer-3 paging protocols.

The disclosed preferred invention embodiment in the form of an API is specified in 'C' language. This API is a combination of attributes and triggers. The difference between attributes and triggers is that attributes are static information about the network, where as triggers carry dynamic information which depends on the current state of the network. The disclosed API is defined for IPv6, but one skilled in the art will quickly recognize that this does not limit the scope of the invention.

A trigger MAY be implemented in many ways:

- A hardware interrupt MAY be an indication of event on layer—an application or protocol stack may catch this interrupt.
- An operating system may provide a system call interface or a callback feature in device drivers for the applications to catch these triggers.
- If this trigger information is available at one place in the network and if it is needed at some other entity or node, the information can be passed using an upper layer protocol.

Each trigger is characterized by its name, time when it occurs, to whom the trigger is delivered and the parameters included in the trigger.

Paging Protocol (L3)

The present invention specifies an IP host alerting protocol, which makes use of triggers from Layer-2 to detect the dormant mode status of the MN. The protocol assumes a mobility scenario in which multiple Layer-2 paging areas are part of a single Layer-3 subnet. It also assumes a partially micro mobility network in which inter-AR handoff is possible in visited domain of the mobile.

MN registers AR's address as COA. The Access Router in visited domain maintains a binding cache, which has entries generally defined by (MN's home IP address, MN's LCOA, MN's dormant status, L2 paging area ID).

When the MN is in active mode, it behaves in the same manner as in MIPv6. So, all the packets destined for MN will first be delivered to AR. AR in turn tunnels the packets to MN using LCOA.

When MN is in idle mode, AR behaves in a different manner. Layer-3 at AR checks the dormant status of MN in its binding cache and detects that MN is in dormant mode. AR pages MN before it delivers packets to MN. After MN responds to Layer-2 paging, AR updates its binding cache and delivers the packets to MN. Address auto-configuration of MN is not done because it is assumed that AR has complete knowledge of all the active addresses in its subnet.

New Paging Mode (0200)

Figure 2:
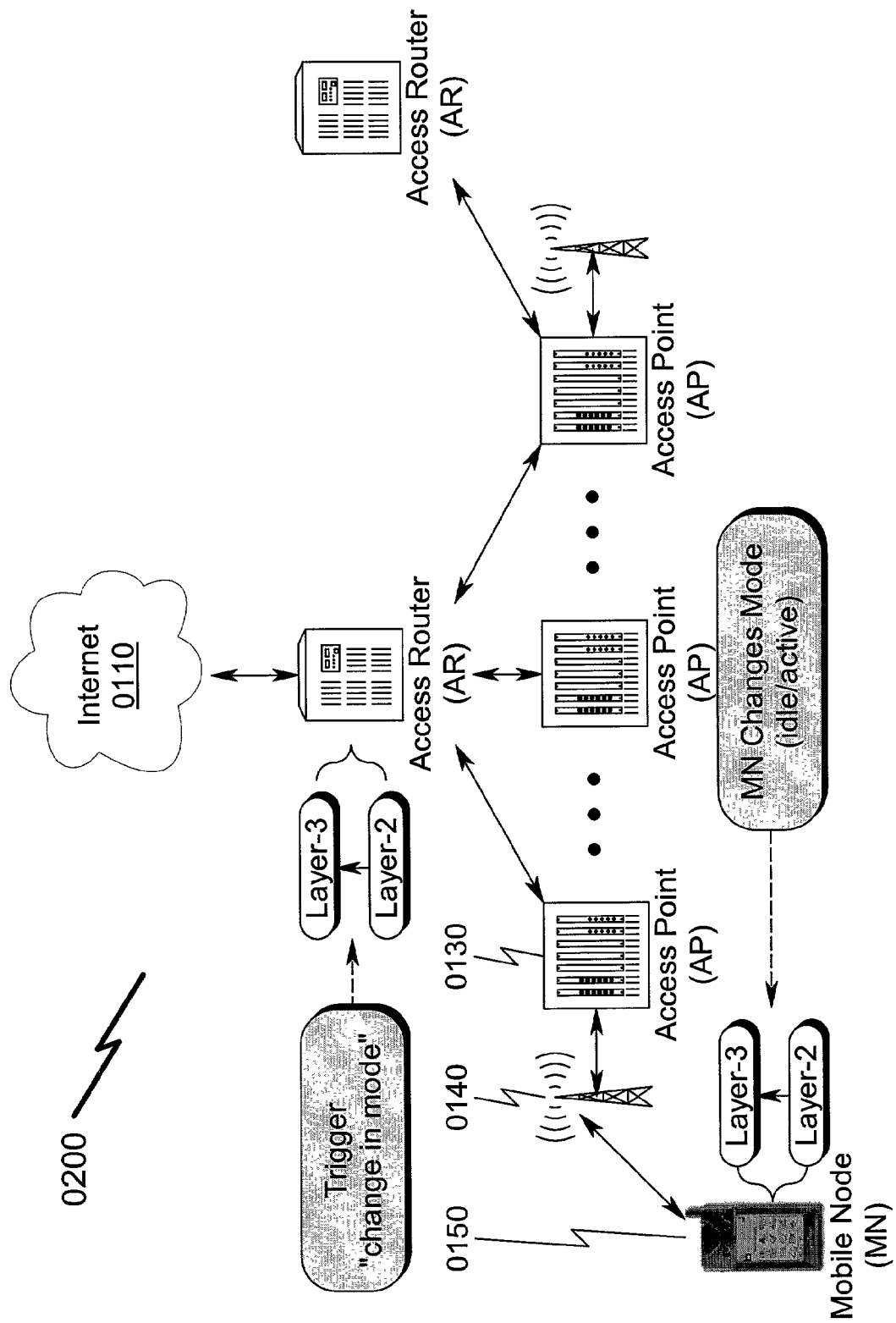

As illustrated in FIG. 2 (0200), Layer-2 paging areas advertise dormant mode support along with the IP identifier of access router (AR), in whose subnet the paging area is located. MN registers with the A/R (Normal MIPv6 registration). MN registers AR's address with Home Agent. MN can voluntarily change the mode {dormant/active}. This information is passed up to Layer-3 of AR using trigger. AR updates its binding cache. Using this trigger, AR can determine whether there is a direct routable L2 connection to reach MN (or) whether MN has to be paged before forwarding the packets.

Movement to a New Paging Area (0300, 0400)

Figure 3:
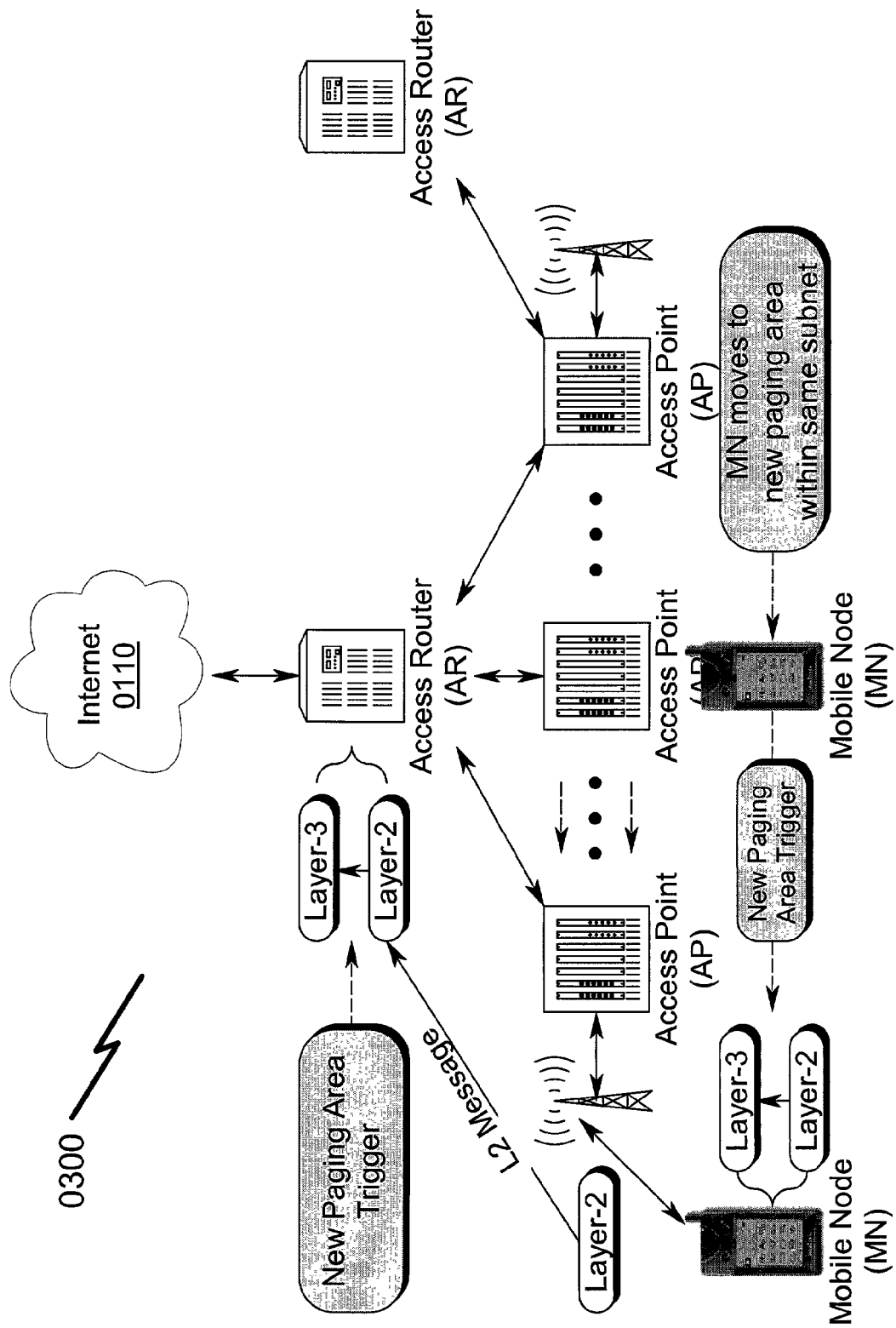
Figure 4:
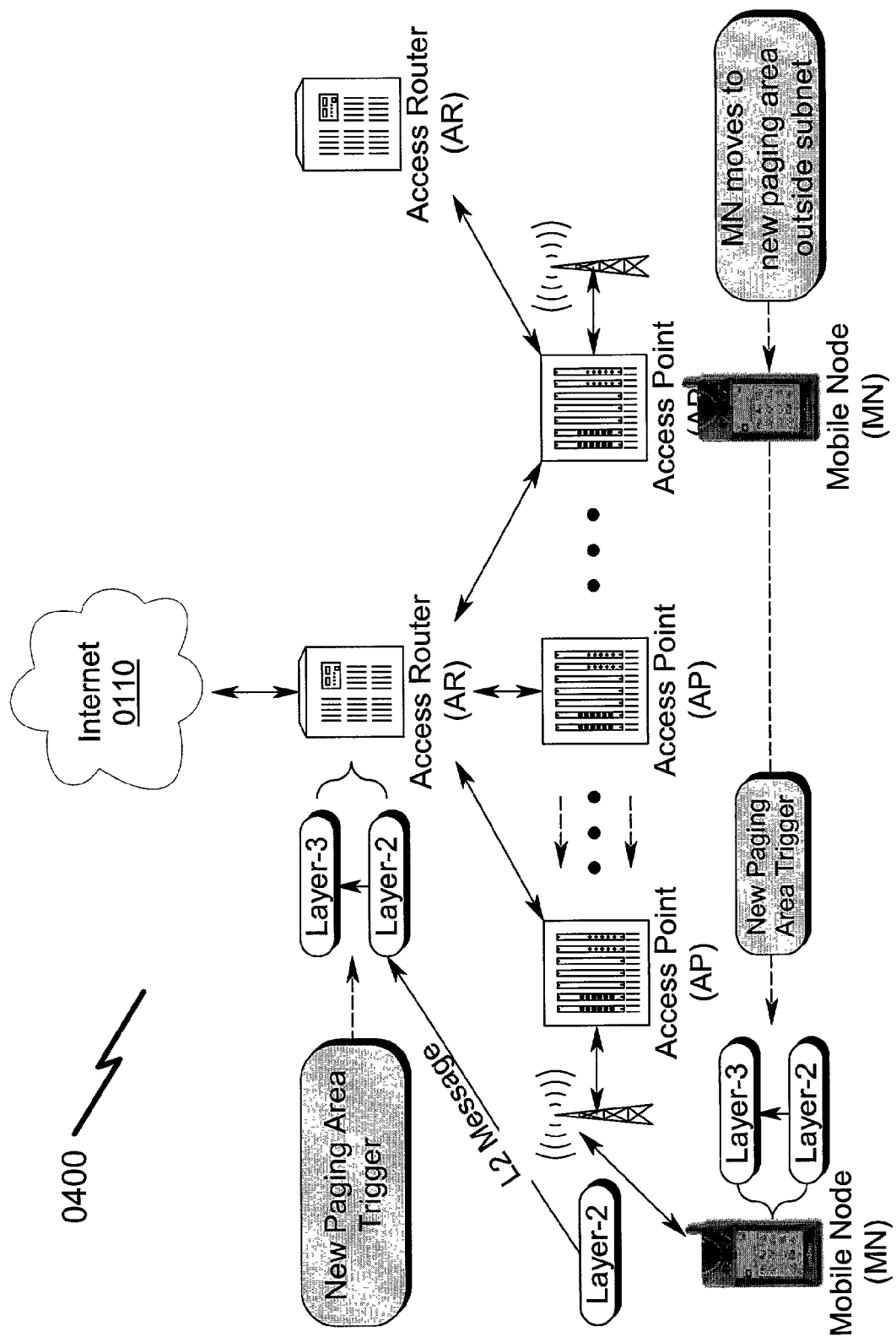

As illustrated in FIG. 3 (0300) and FIG. 4 (0400), when the MN moves to a different paging area, it needs to determine if the new Layer-2 paging area is in the area covered by same AR, with which it has registered its Layer-3 interface. When the MN moves to a new paging area, "New paging area" trigger is sent to Layer-3 from Layer-2 at AR and MN. The trigger contains the information about the IP address of AR. Using this trigger, MN can determine whether it needs to perform a new Layer-3 registration or not. Using this trigger, AR can determine the Layer-2 paging area, in which MN is located.

FIG. 3 (0300) illustrates the case when a MN moves between two paging areas in the same subnet. FIG. 4 (0400) illustrates the case when a MN moves between paging areas of different subnets.

Initiating Mobile Node Paging (0500)

Figure 5:
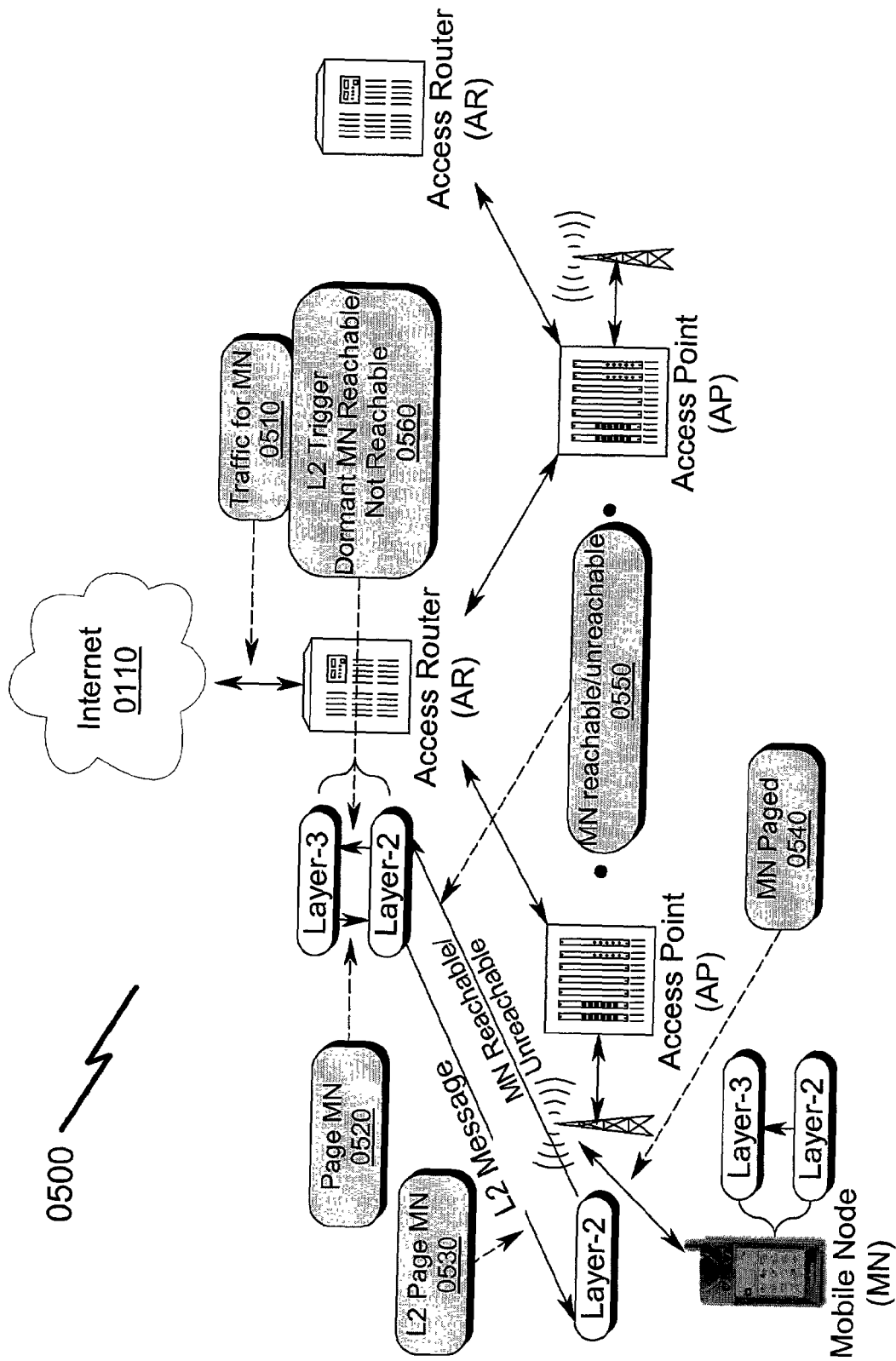

FIG. 5 (0500) generally illustrates the signal and trigger flow when initiating Mobile Node Paging. Here the process generally begins with traffic for a MN (0510). The MN is paged at the Layer-3 level (0520). This generates a Layer-2 Page MN message (0530). The MN is then paged (0540). This results in a return Layer-2 message of "reachable" or "unreachable" (0550), which is then translated to a corresponding Layer-3 message (0560).

When MN is in idle mode and AR receives traffic for the MN, the AR pages the MN before delivering packets to it. If the MN is not found (i.e., the MN did not respond to Layer-2 paging), "Dormant MN not reachable" trigger is sent up to Layer-3 at the AR (0560). The AR sends "ICMP destination unreachable" message back to the correspondent node and deletes the binding cache entry of MN. If the MN is found, "Dormant MN reachable" trigger is sent up to Layer-3 at AR. At this point the AR starts delivery of packets to MN.

Paging Protocol Method

Paging Protocol Overview (0600)

Figure 6:
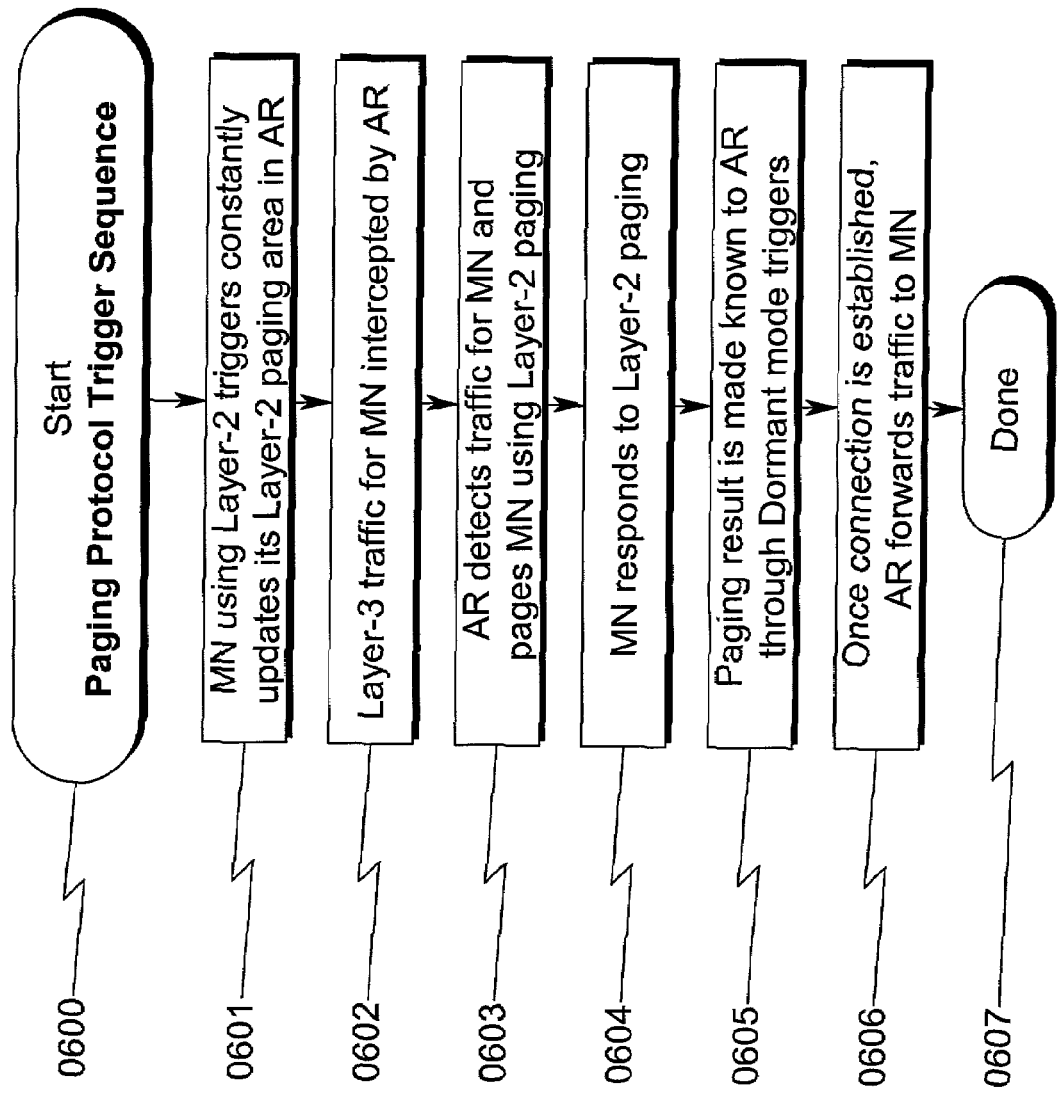
FIGS. 6-8 illustrate exemplary method flowcharts implementing the teachings of the present invention.

A preferred embodiment of the present invention paging protocol method is generically illustrated by the flowchart of FIG. 6 (0600). A graphical illustration of communication flows associated with the paging protocol is illustrated in FIG. 5 (0500). This general sequence will now be discussed in detail.

Referencing FIG. 6 (0600), the trigger sequence generally starts with the MN using Layer-2 triggers to constantly update its Layer-2 paging area location in access router (0601). This sequence is also graphically illustrated in FIG. 3 (0300) and FIG. 4 (0400). The advantage with this new paging area trigger is that the MN need not come out of dormant mode to perform Layer-3 registrations. In this implementation all the required location updates and registrations are carried out by Layer-2.

Layer-3 traffic for the MN is first intercepted by the access router (0602). Once the AR detects traffic for MN, it pages MN using Layer-2 paging (0603). The MN responds to Layer-2 paging (0604). The result of paging is made known to access router through Dormant mode reachable (or) Dormant mode unreachable trigger (0605). Since the connection is established, the access router can go ahead and forward the traffic (0606). The advantage of this triggering mechanism is that there is no need for another Layer-3 mechanism (or) messages to perform Layer-3 paging.

MN Not Reachable (0700)

Figure 7:
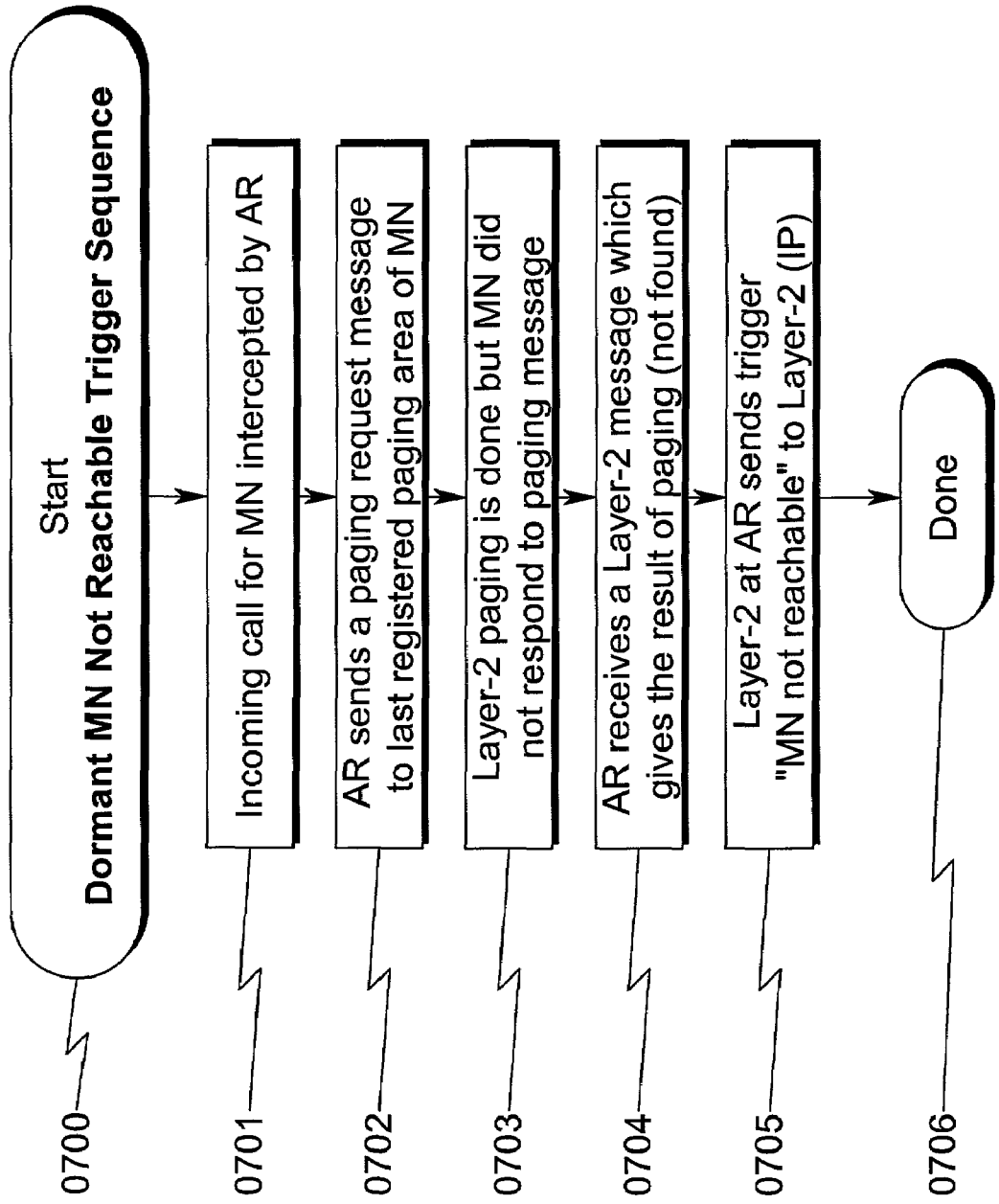

The general sequence of events that occur when a mobile node is not reachable is illustrated in FIG. 7 (0700). This general sequence will now be discussed in detail.

The sequence begins with the incoming call for the MN being intercepted by the AR (0701). The AR then sends a paging request message to the last registered paging area of MN (0702). Layer-2 paging is done but in this case the MN did not respond to the paging message (0703). The AR receives a Layer-2 message that gives the result of paging (not found) (0704). Layer-2 at the AR then sends the trigger "MN not reachable" to Layer-2 (IP) (0705).

MN Reachable (0800)

Figure 8:
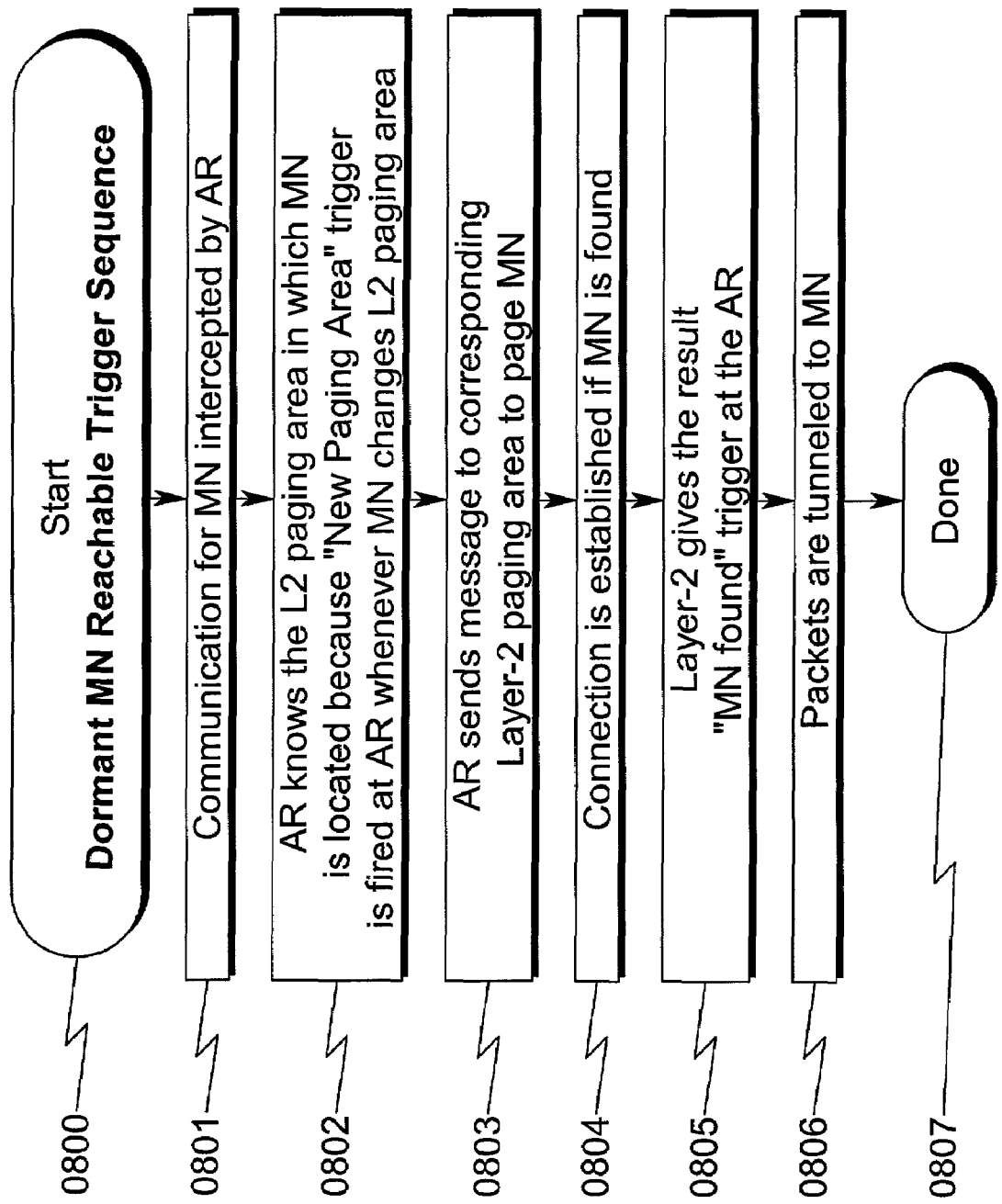

The general sequence of events that occur when a mobile node is found reachable is illustrated in FIG. 8 (0800). This general sequence will now be discussed in detail.

The sequence begins when a communication for a MN is intercepted by the AR (0801). The AR knows the Layer-2 paging area in which the MN is located because a "New Paging Area" trigger is fired at the AR whenever the MN changes Layer-2 paging area (0802). The AR then sends a message to the corresponding Layer-2 paging area to page the MN (0803). A connection is established if the MN is found (0804). At this point Layer-2 gives the result "MN found" trigger at the AR (0805). Packets can now be tunneled to the MN (0806).

Trigger Usage (0900)

The protocol discussed previously does not specify how Layer-3 at AR has obtained the knowledge of the Layer-2 paging area, in which MN is located and the status of the MN (Dormant/Inactive/Active/etc.). Layer-2 triggers are used to fill up this gap.

Figure 9:
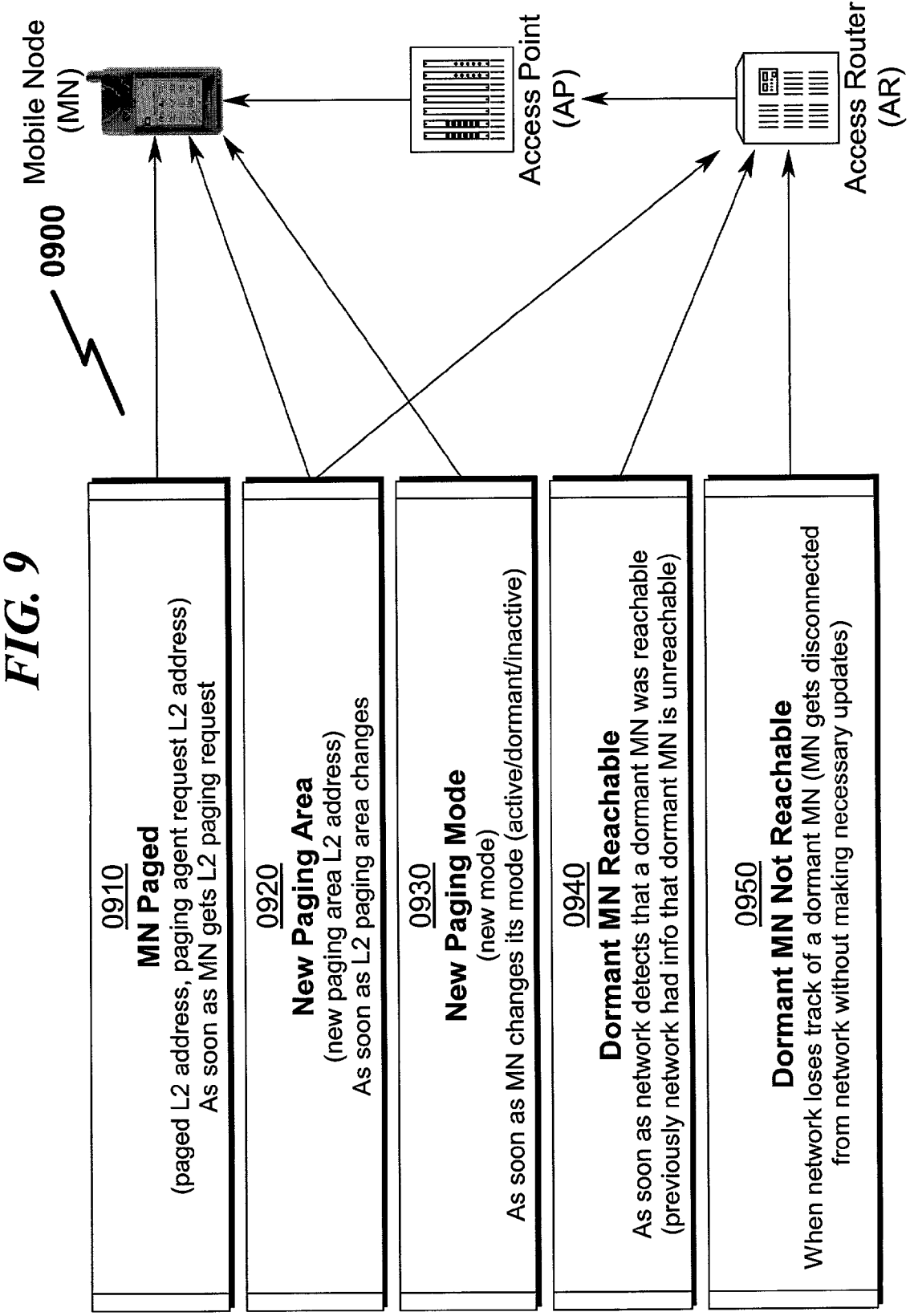
FIG. 9 illustrates an exemplary assembly of triggers implementing the teachings of the present invention.

The triggers used in the protocol are defined as illustrated in FIG. 9 (0900) and may generally be defined as follows:
  MN Paged (0910) [issued as soon as MN gets L2 paging request];
  New Paging Area (0920) [issued as soon as L2 paging area changes];
  New Paging Mode (0930) [issued as soon as MN changes its mode (active/dormant/inactive)];
  Dormant MN Reachable (0940) [issued as soon as network detects that a dormant MN is reachable];
  Dormant MN Not Reachable (0950) [issued as soon as network loses track of a dormant MN].

One skilled in the art will recognize that this list may be added to or subtracted from without loss of generality.

Network Paging API (1000-1500)

Figure 10:
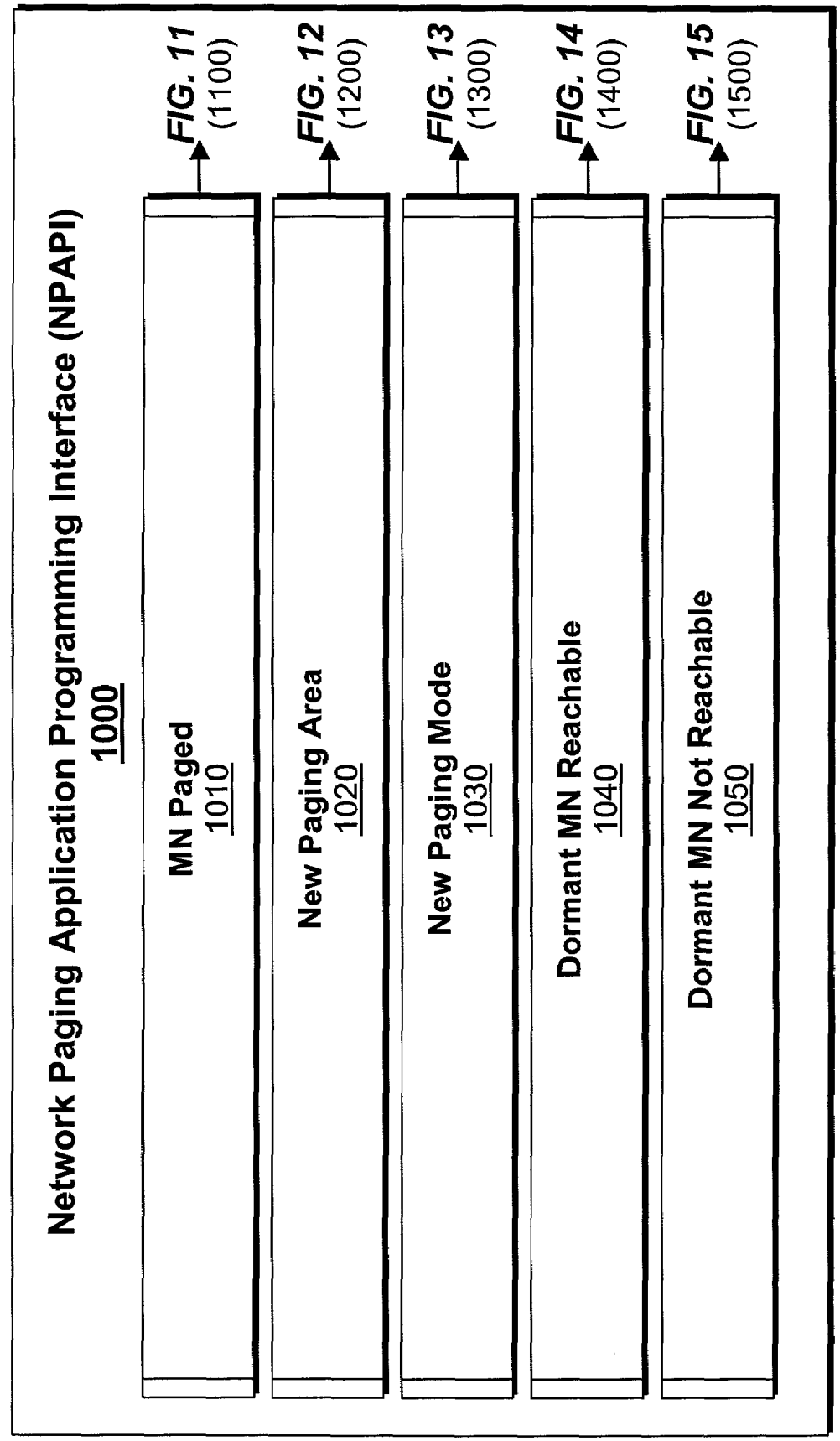
FIGS. 10-15 illustrate typical API methods implementing the triggers detailed in FIG. 7.

As generally illustrated in FIG. 10 (1000), the disclosed paging API is designed to be used as a Layer-3 dormant mode host alerting protocol. Though the API disclosed is based on the triggers defined elsewhere, any Layer-3 paging protocol can make use of these Layer-2 triggers.

The general elements present in the disclosed Network Paging API contain the following triggering components:
  MN Paged (1010);
  New Paging Area (1020);
  New Paging Mode (1030);
  Dormant MN Reachable (1040); and
  Dormant MN Not Reachable (1050).

While some implementations may add to or detract from this list, this decision will be implementation specific and not detract from the overall scope of the present invention. A detailed discussion of each triggering subsystem follows.

MN Paged (1100)

Figure 11:
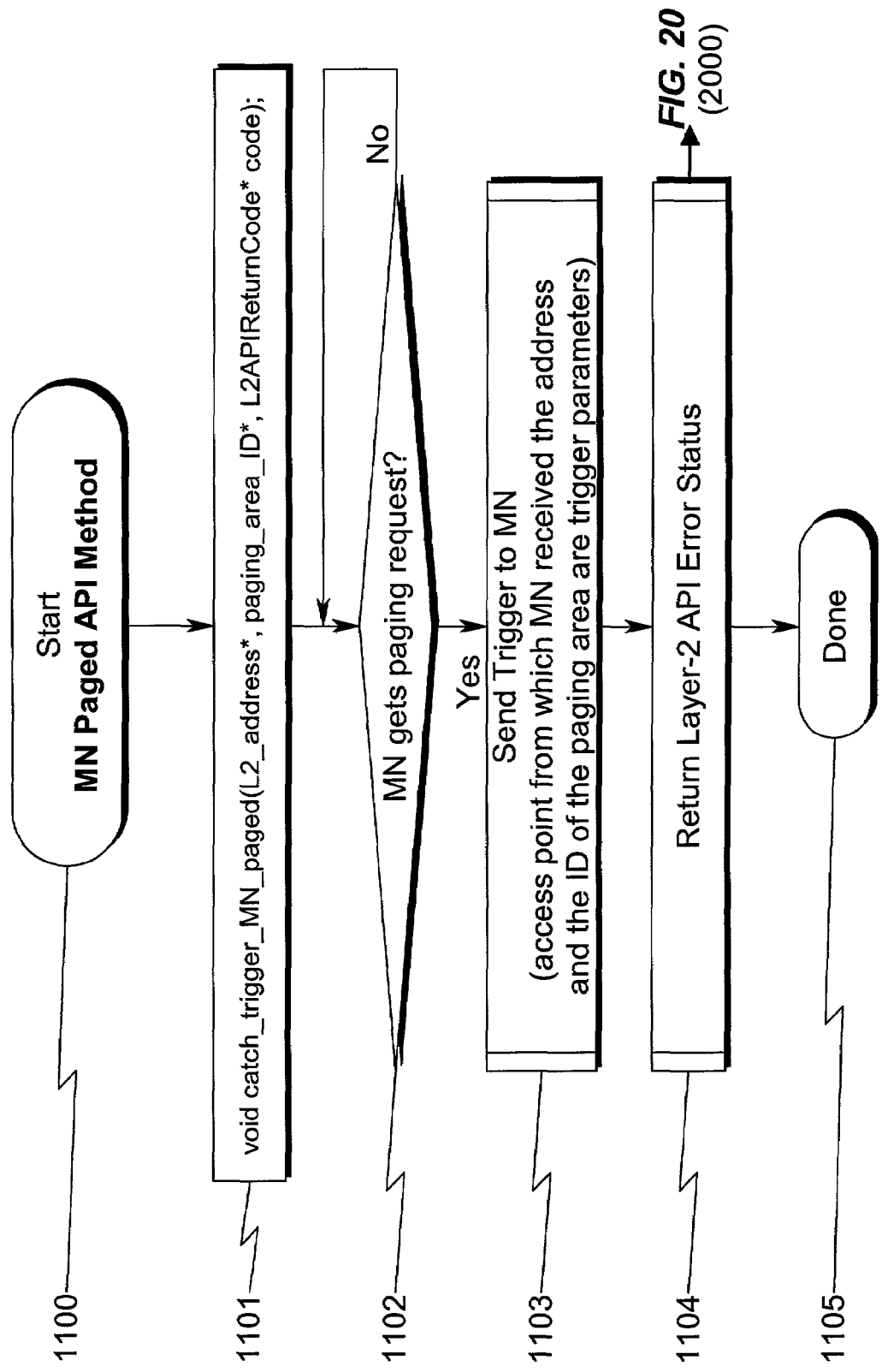

As illustrated in FIG. 11 (1100), this trigger (1101) must be sent to MN as soon as it gets a paging request. The access point from which it received the address and the ID of the paging area are the parameters of the trigger.

New Paging Area (1200)

Figure 12:
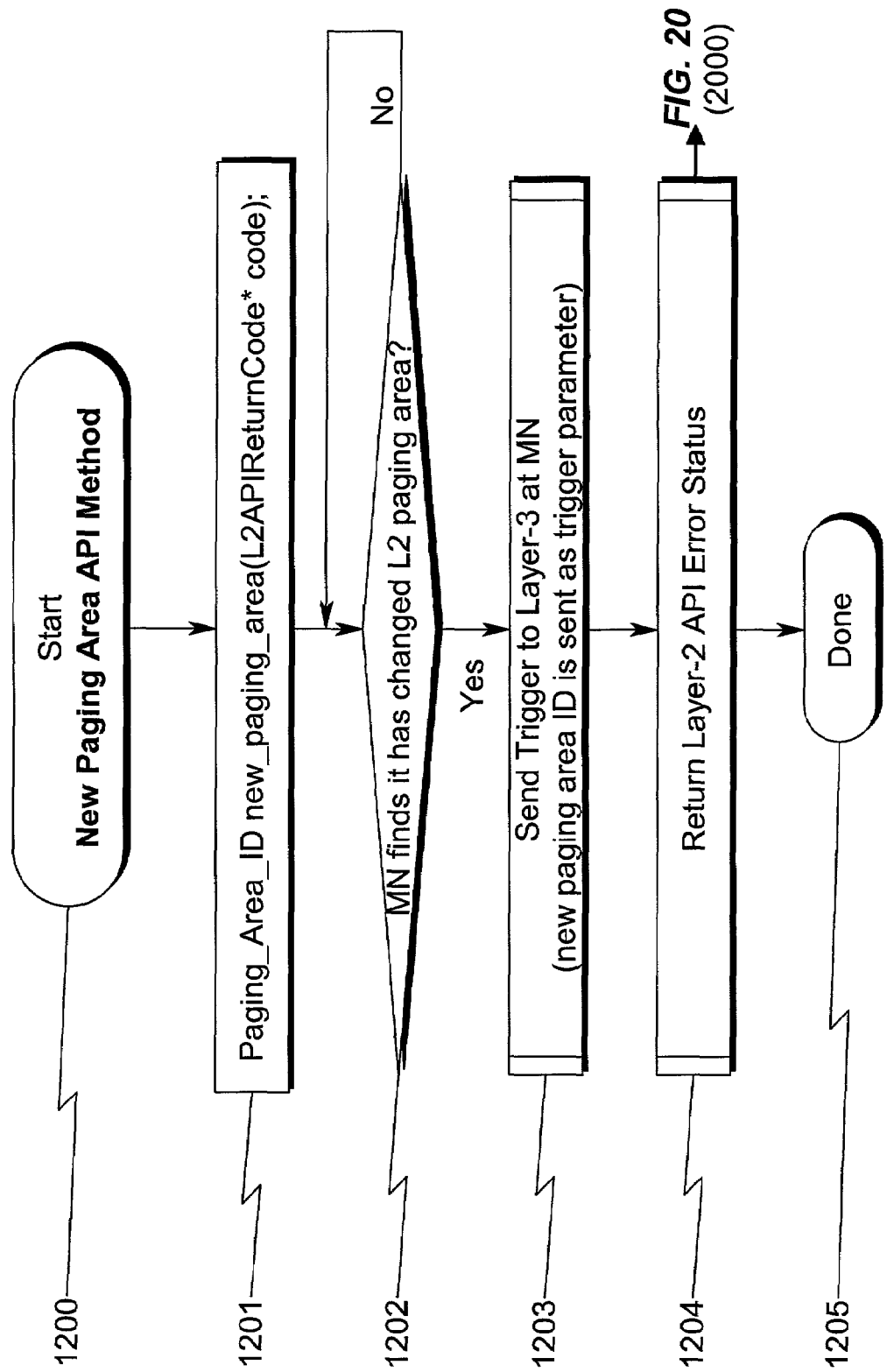

As generally illustrated in FIG. 12 (1200), this trigger (1201) must be sent to Layer-3 at MN as soon as MN finds that it has changed Layer-2 paging area. The new paging area ID is sent as parameter.

Here Layer-2 informs Layer-3 at tracking agent and mobile host whenever MN changes Layer-2 paging area in dormant mode. This callback MUST be returned at Layer-3 of tracking agent and mobile host. New paging area ID is replied back to the calling function.

The callback function at MN may be equivalently defined as
  Paging_Area_ID new$_{13}$ paging_area(L2APIReturnCode* code);

The callback function at tracking agent may be equivalently defined as
  Paging_Area_ID new_paging_area (L2_address* MN, L2APIReturnCode* code);

New Paging Mode (1300)

Figure 13:
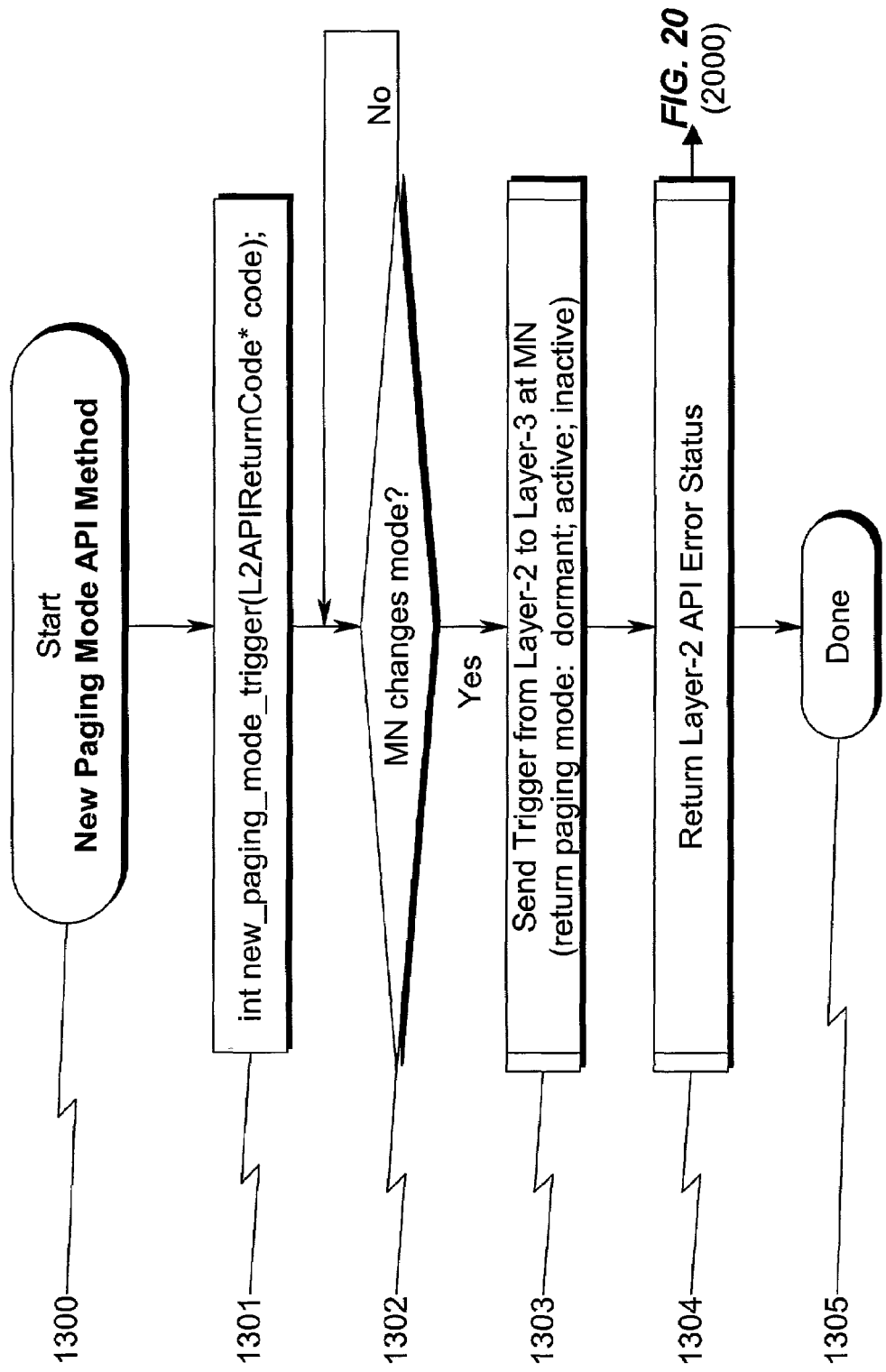

As generally illustrated in FIG. 13 (1300), the Layer-3 at MN must be informed by Layer-2 whenever it changes its mode (Dormant/Active/Inactive). If this trigger (1301) can be used then the paging registration messages can be avoided. The callback at MN may be equivalently defined as
  int new_paging_mode_trigger(L2APIReturnCode* code);

The callback at the tracking agent may be equivalently defined as
  int new_paging_mode_trigger (L2_address* MN_address,L2APIReturnCode* code);

The MN's address is returned in the address referenced by MN—address. The return values of the callbacks may be typically defined as
  0 for dormant mode
  1 for Active mode
  2 for inactive mode Dormant MN Reachable (1400)

Figure 14:
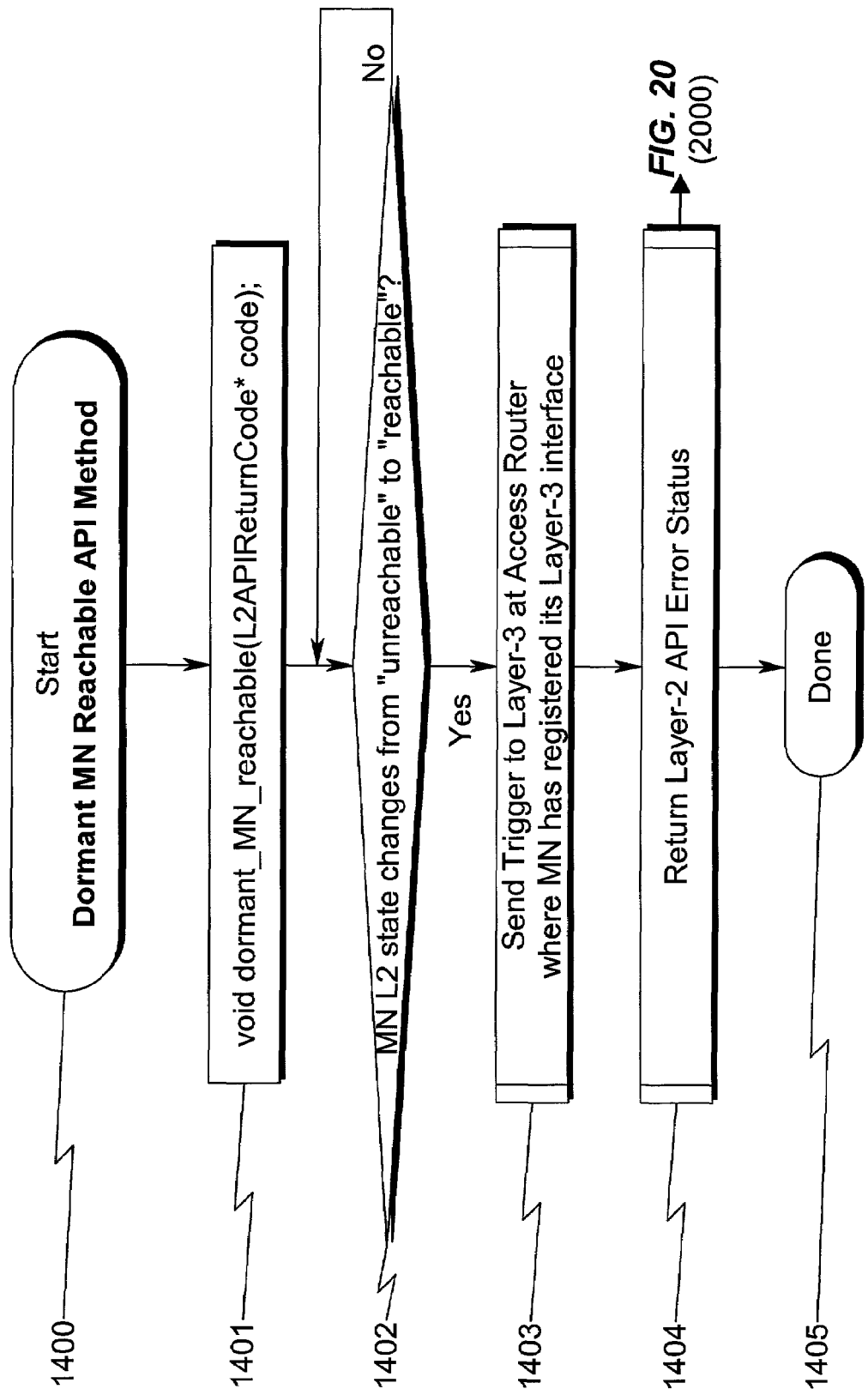

As generally illustrated in FIG. 14 (1400), as soon as the MN reconnects to the network, this trigger (1401) should be sent to Layer-3 at the Access Router, where MN has registered its Layer-3 interface. This trigger should be sent to Layer-3 only when MN's state in Layer-2 changes from "unreachable" to "reachable".

This is sent to Layer-3 of tracking agent when MN is paged and reply is received from MN. The callback function for this trigger may be equivalently defined as
  void pagingReply((L2_address* MN, L2APIReturnCode* code);

Dormant MN Not Reachable (1500)

Figure 15:
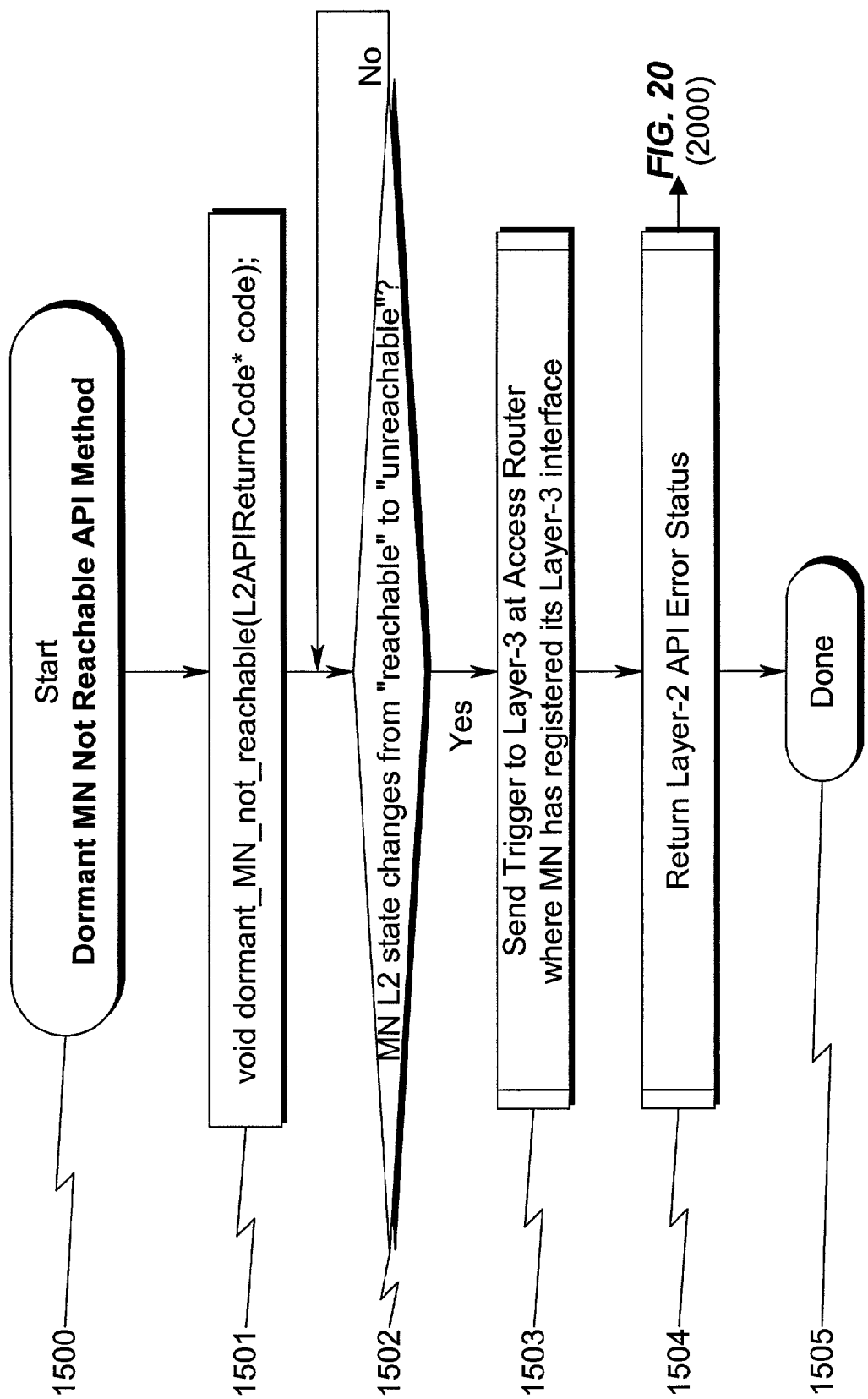

As generally illustrated in FIG. 15 (1500), this trigger (1501) should be sent at Layer-3 of the access router, as soon as network detects that MN is not reachable. This trigger should be sent to Layer-3 only when MN's state in Layer-2 changes from "reachable" to "unreachable".

This trigger is sent to Layer-3 of tracking agent when MN is paged and no reply is received from MN within "MAX_PAGING_TIME". The callback function for this trigger may be equivalently defined as
  void pagingTimeOut((L2_address* MN, L2APIReturnCode* code);

Data Structures (1600-2000)

Overview

Triggers are defined as callback functions. Applications register with these callback functions that in turn notify as soon as Layer-2 trigger is fired. The trigger functions are blocking, in the sense the applications are blocked at the point they call these trigger API, until the trigger is fired.

The disclosed exemplary API assumes that characters are 8-bit wide and integers are 16-bit wide. All the strings (or) array of characters used in API are standard null terminated 'C' strings. Callbacks are used to define the API. A library of callbacks can be defined, each representing one function of Layer-2 API. Concurrency in processing these triggers can easily be provided by using threads or processes. The data types of structure elements given in this document are intended to be examples, not strict requirements.

Exemplary Data Structures (1600)

Figure 16:
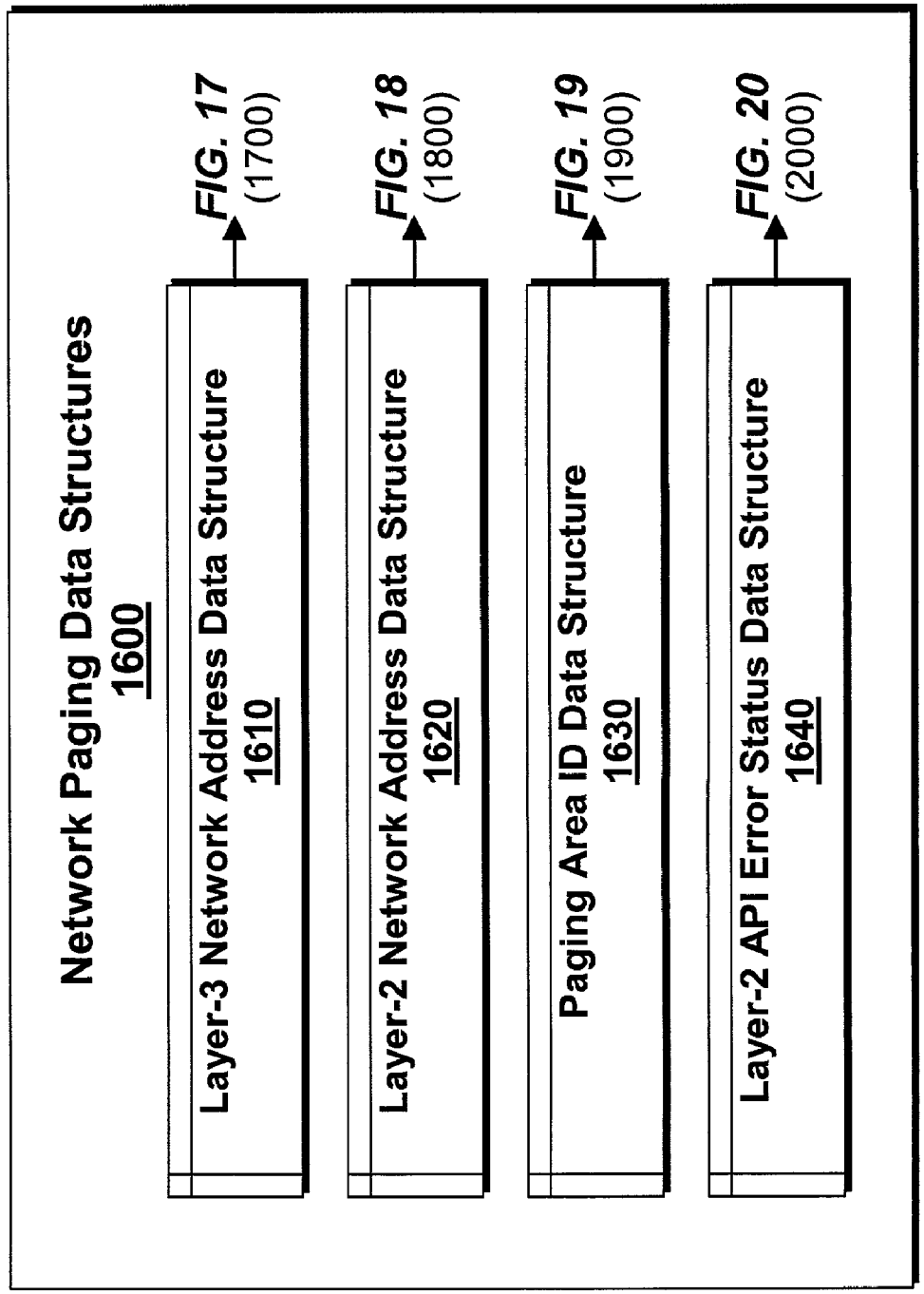
FIGS. 16-20 illustrate typical data structures useful in implementing the API trigger methods in FIGS. 9-15.

As generally illustrated in FIG. 16 (1600), an exemplary complement of data structures that may be implemented within the present invention include the following:
  Layer-3 Network Address Data Structure (1610);
  Layer-2 Network Address Data Structure (1620);
  Paging Area ID Data Structure (1630); and/or
  Layer-2 API Error Status Data Structure (1640).

One skilled in the art will recognize that these exemplary structures may be added to or subtracted from with no loss of generality in the teachings of the present invention. The particular details of this preferred embodiment are discussed in the following section.

Format of Data Types

Primitive data types as described herein follow the POSIX format. POSIX format is a standard format for defining APIs. For example, uintN_t means an unsigned integer of exactly 'N' bits.

IPv6/IPv4 Address (1700)

Figure 17:
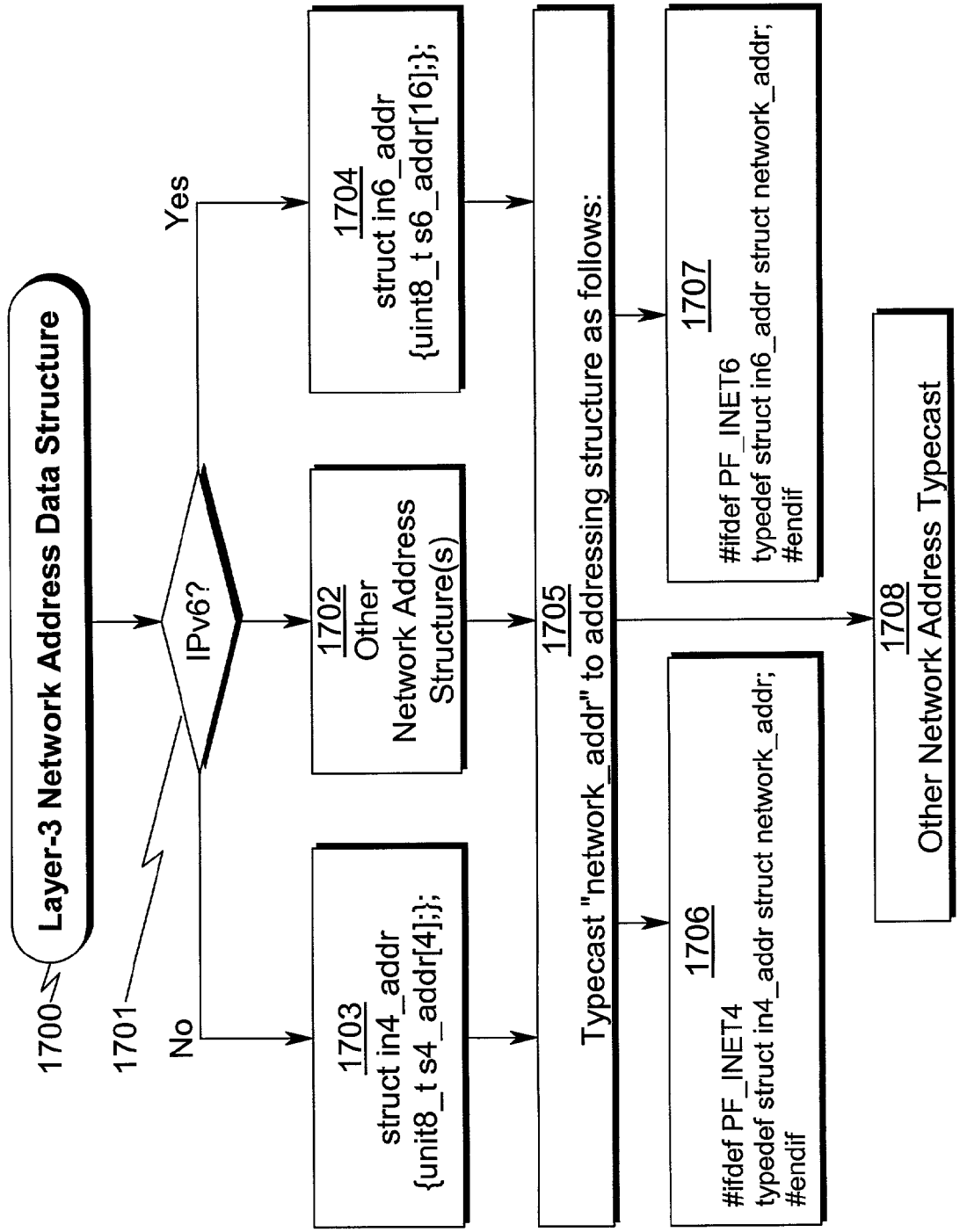

As illustrated in FIG. 17 (1700), this data structure contains an array of sixteen 8-bit elements, which make up one 128-bit Ipv6 address. IPv6 address is stored in network byte order.

For IPv6 (1701), the Layer-3 address is defined as illustrated in FIG. 17 (1704). For IPv4, Layer-3 address is defined as illustrated in FIG. 17 (1703). Otherwise, some other network address structure is used (1702).

In each case "network_addr" is typecast to the addressing structure (1705), used in the system as illustrated in FIG. 17 (1706, 1707, 1708).

Layer-2 Address (1800)

Figure 18:
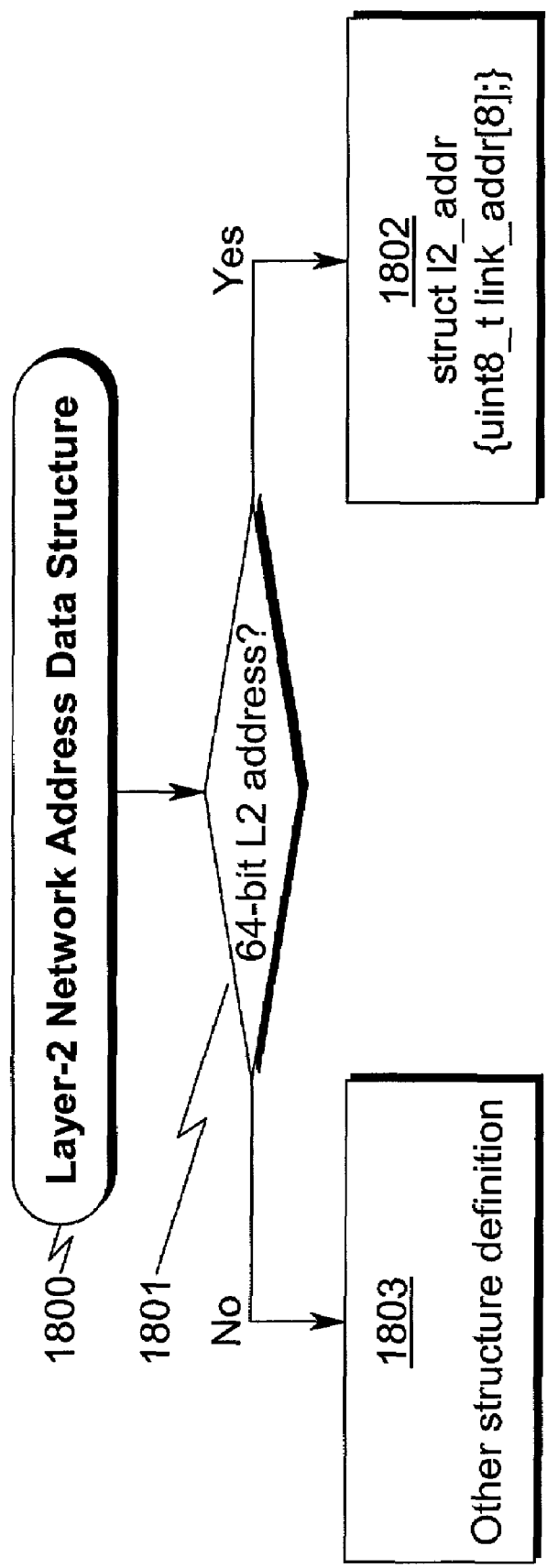

As illustrated in FIG. 18 (1800), this structure assumes (1801) that the size of Layer-2 address is 64 bits (1802). If a specific L2 has a different size it should be defined accordingly (1803).

Paging Area ID (1900)

Figure 19:
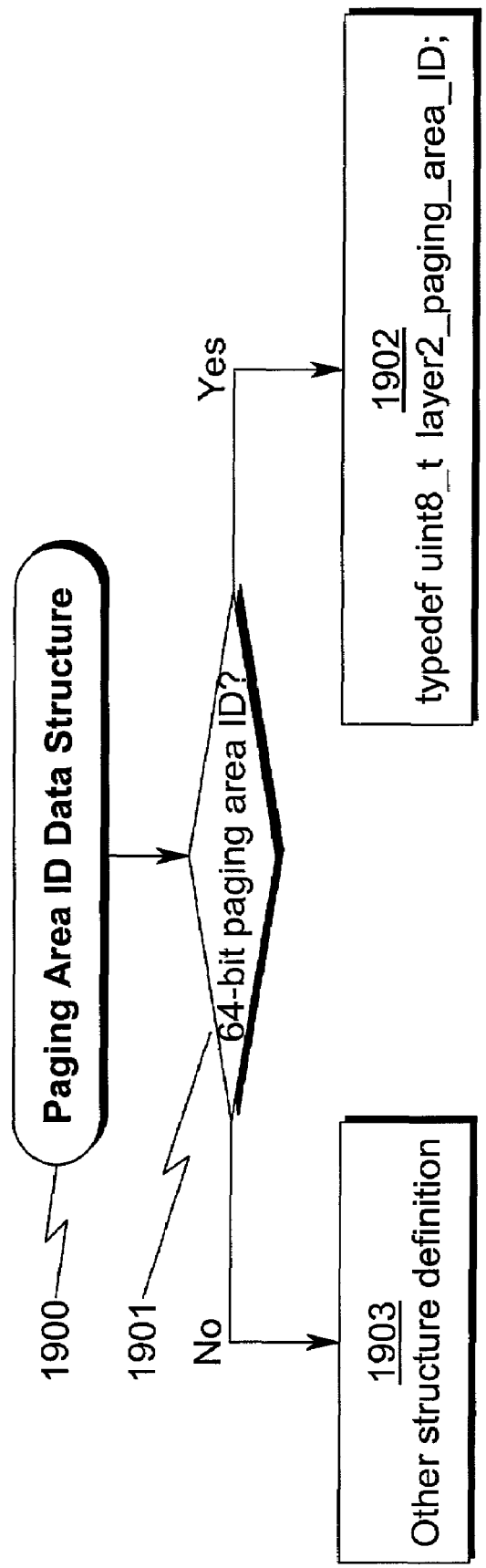

As illustrated in FIG. 19 (1900), the exemplary API assumes (1901) that paging area ID is of size 64 bits (1902). If the size of paging area ID is different, it should be changed accordingly (1903).

Return Codes (2000)

Figure 20:
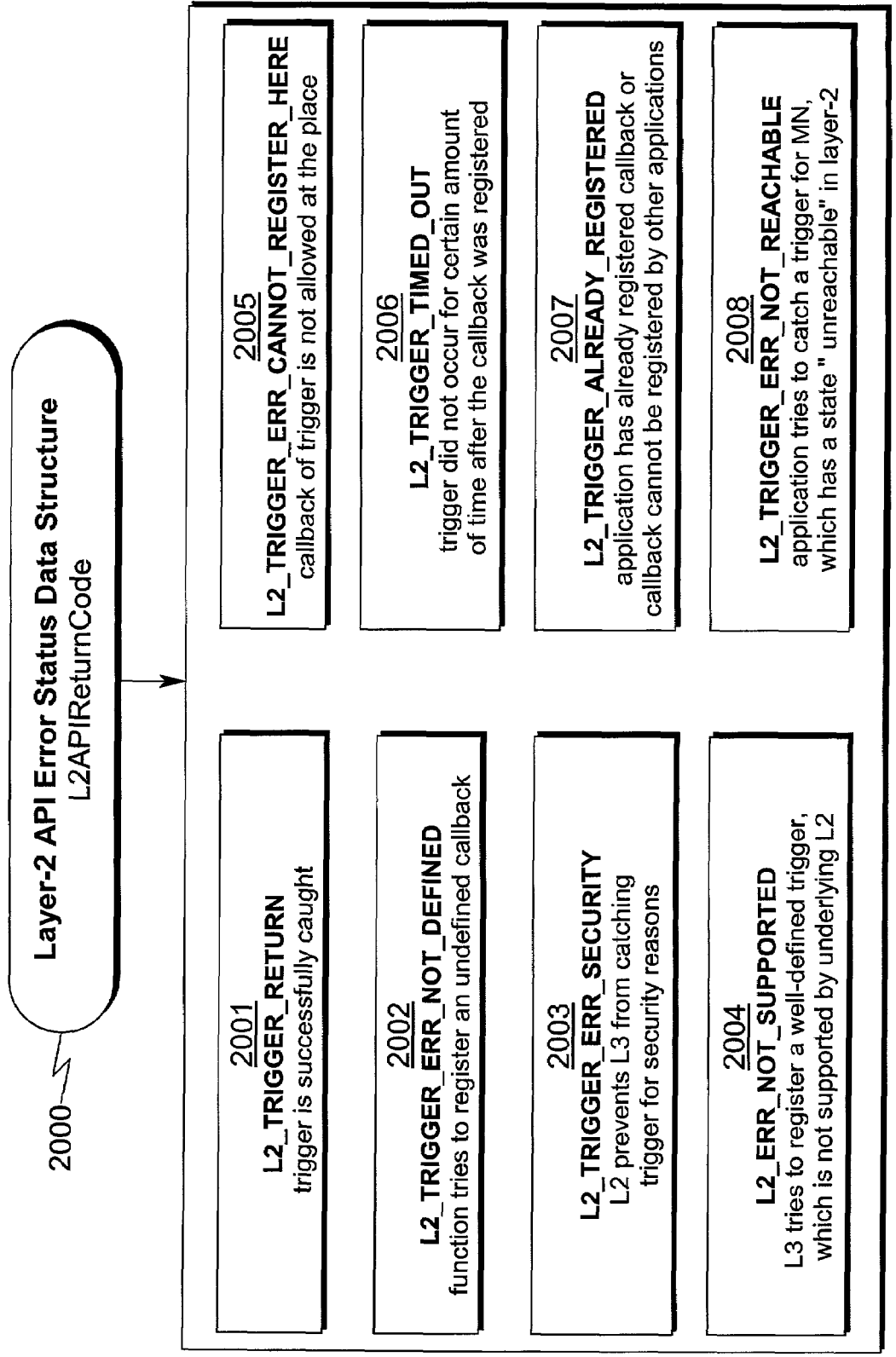

As illustrated in FIG. 20 (2000), a list of error codes, which may be returned by callbacks, can be defined as follows:

```
typedef enum
{
    L2_TRIGGER_RETURN =0
    L2_TRIGGER_ERR_NOT_DEFINED,
    L2_TRIGGER_ERR_SECURITY,
    L2_TRIGGER_ERR_NOT_SUPPORTED,
    L2_TRIGGER_ERR_CANNOT_REGISTER_HERE,
    L2_TRIGGER_ERR_TIMED_OUT,
    L2_TRIGGER_ERR_ALREADY_REGISTERED,
    L2_TRIGGER_ERR_NOT_REACHABLE
} L2APIReturnCode;
```

These Error Status conditions will now be described in detail. The following is a description of the reasons when the error codes are returned and reference FIG. 20.

L2 TRIGGER RETURN (2001)

This code is returned if the trigger is successfully caught.

L2 TRIGGER ERR NOT DEFINED (2002)

This code is returned when a function tries to register an undefined callback.

L2 TRIGGER ERR SECURITY (2003)

This error is returned, if L2 prevents L3 from catching the trigger for security reasons

L2 ERR NOT SUPPORTED (2004)

This error code is returned when L3 tries to register a well-defined trigger, which is not supported by the underlying L2.

L2 TRIGGER ERR CANNOT REGISTER HERE (2005)

This error code is returned if the callback of trigger is not allowed at the place, this function was called.

L2 TRIGGER TIMED OUT (2006)

This error code is returned, if the trigger did not occur for certain amount of time after the callback was registered. L2 does not remember this callback any more.

L2 TRIGGER ALREADY REGISTERED (2007)

This error code is returned if an application has already registered this callback and if the same callback cannot be registered by two or more applications.

L2 TRIGGER ERR NOT REACHABLE (2008)

This error code is returned if an application tries to catch a trigger for MN, which has a state "1 unreachable" in Layer-2. This can be because MN has not performed location/periodic updates.

Attributes

Overview

Attributes convey information about the behavioral properties of the network, such as their processing speed limitations, time taken to do specific tasks and the specific mechanisms hey follow. They do not change with time. The disclosed embodiment defines a set of attributes related to paging. Attributes are not for managing the network; instead, they define the properties of the network. Layer-3 can get a rough idea of limitations and properties of the Layer-2 from these attributes.

Identified Attributes

Only a basic set of attributes is defined in this exemplary embodiment, but may be readily expanded by one skilled in the art using the teachings of the present invention.

Support for Dormant Mode
  1 if the layer-2 has support for paging;
  0 otherwise Max Paging Time
  This field is represented in microseconds.

Paging Type
  0 if it uses time slotted paging;
  1 Otherwise (i.e., if paging can be done at any time)

Support for Broadcast Paging
  0 if MN requires a dedicated channel for paging
  1 Otherwise (i.e., MN can also respond to broadcast paging)

API for Accessing Attributes

While a wide variety of attribute access methods are possible, one preferred API access method uses the function prototype
  char* get_L2_attribute(int id);

The ID of the attribute should be as argument to the callback function. A wide variety of methods for attribute storage will be well known to one skilled in the art. Attributes MAY typically be stored in a file sequentially one after the other.

PREFERRED SYSTEM CONTEXT OF THE PRESENT INVENTION

Distributed Network Application (2100)

Figure 21:
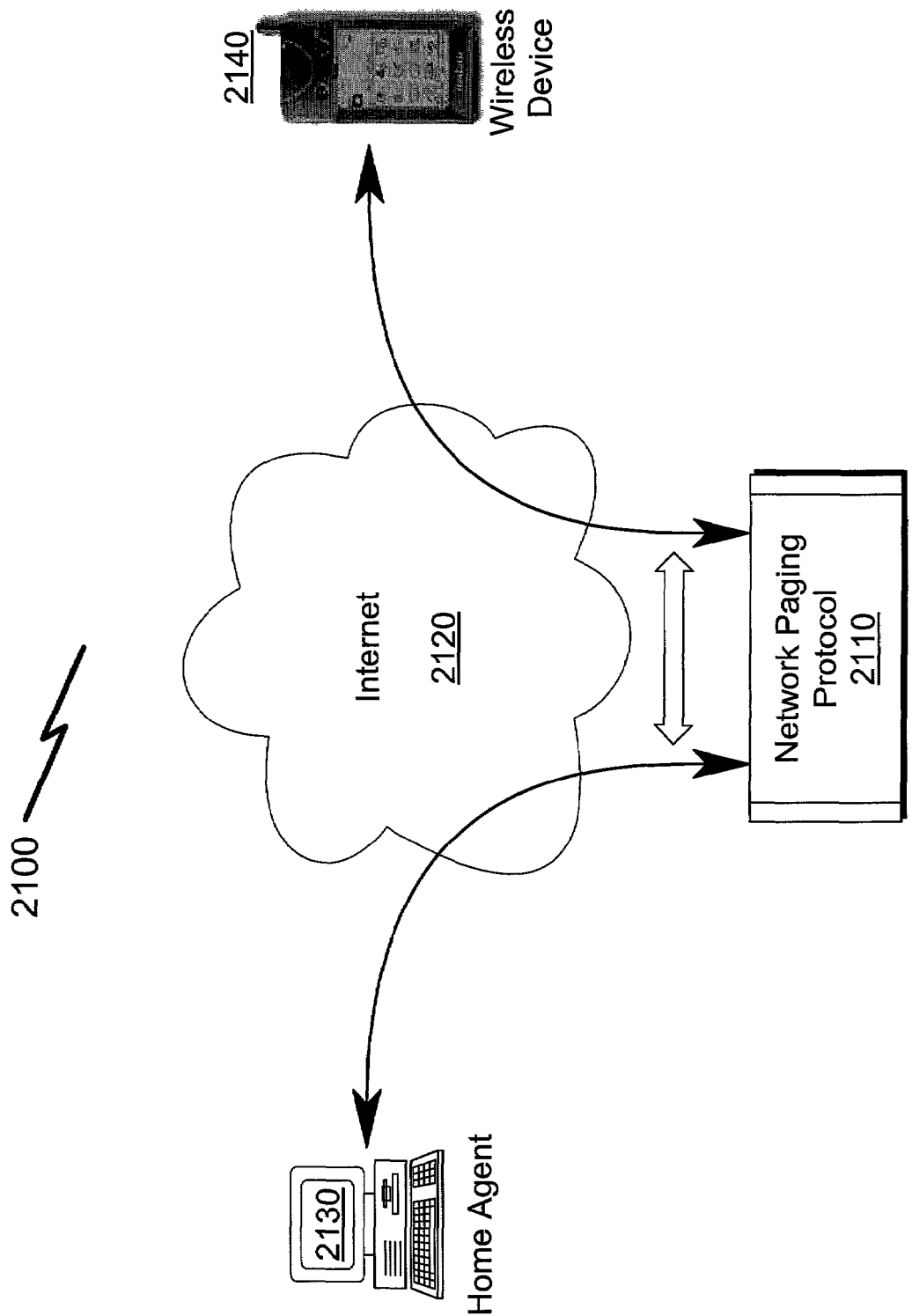
FIG. 21 illustrates a generic overview of the present invention as applied to Internet communications.

As illustrated generically in FIG. 21 (2100), the present invention (2110) may be generally described as permitting communication over the Internet (2120) between a home agent (2130) and an arbitrary wireless device (2140) using a network paging protocol designed to specifically limit the energy consumption of the mobile node (2140).

Computer Software Media (2200)

Figure 22:
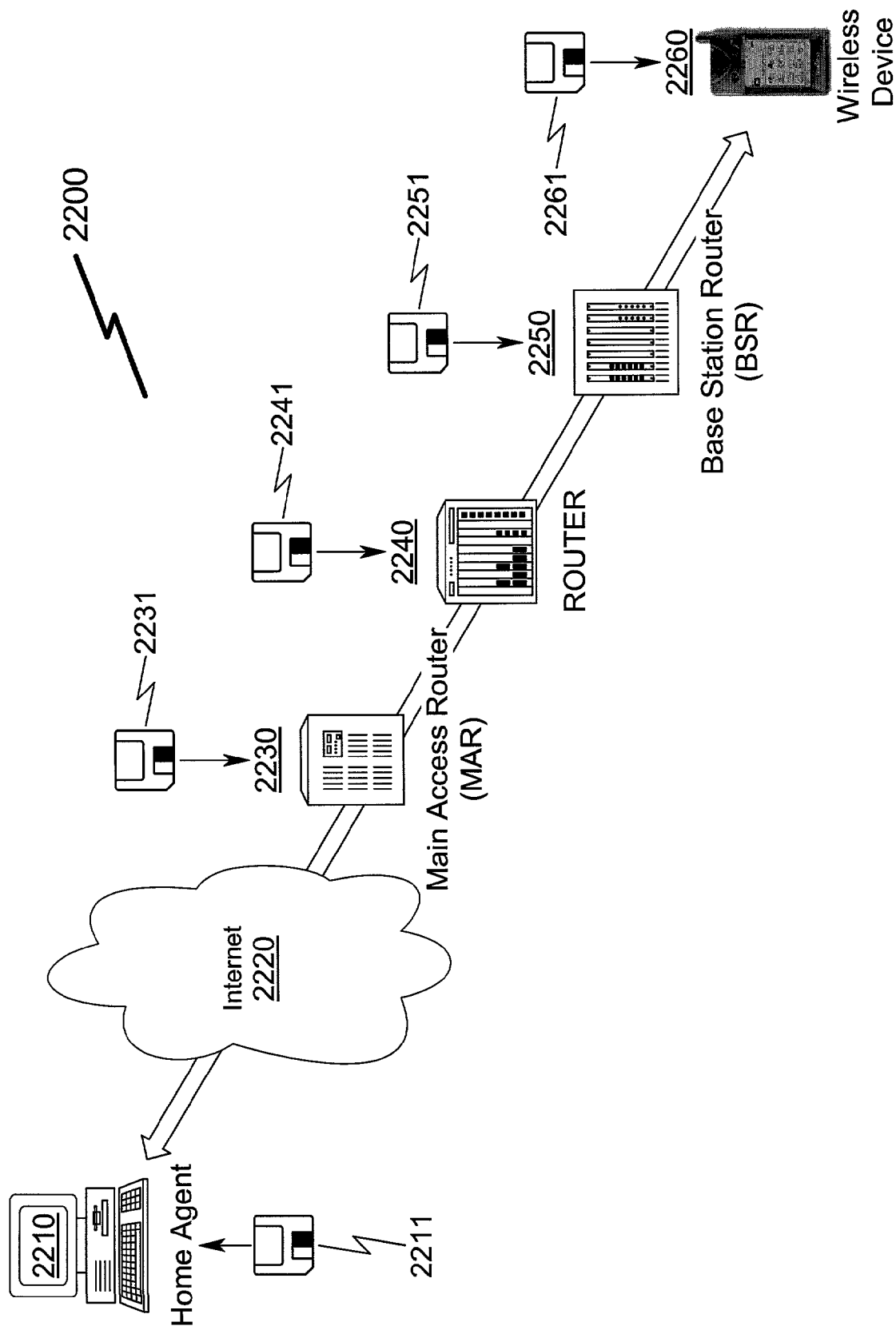
FIG. 22 illustrates a generic overview of the present invention as applied to a computer readable software medium.

As illustrated generically in FIG. 22 (2200), the present invention anticipates the distributed nature of software as embodied in a variety of computer readable media, whether they be in one or more home agents (2211) or other network devices that communicate through the Internet (2221) via a series of software protocols to one or more Main Access Router (2231), Router (2241), and/or Base Station Router (2251) software components to one or more cooperating wireless devices (2261) operating under a coordinated software protocol embodied in a computer readable medium.

Signal Encoding (2300, 2400)

It will be clear to one skilled in the art that the protocols and methods as taught by the present invention may be encoded in a wide variety of ways and that the resulting signals comprising these protocols may be transmitted in a wide variety of networking contexts. The present invention specifically anticipates that the protocols and associated methods described herein will be applied to network signaling methodologies to generate unique signal streams that may be used to affect micro-mobility network portability for generalized IP signaling.

Figure 23:
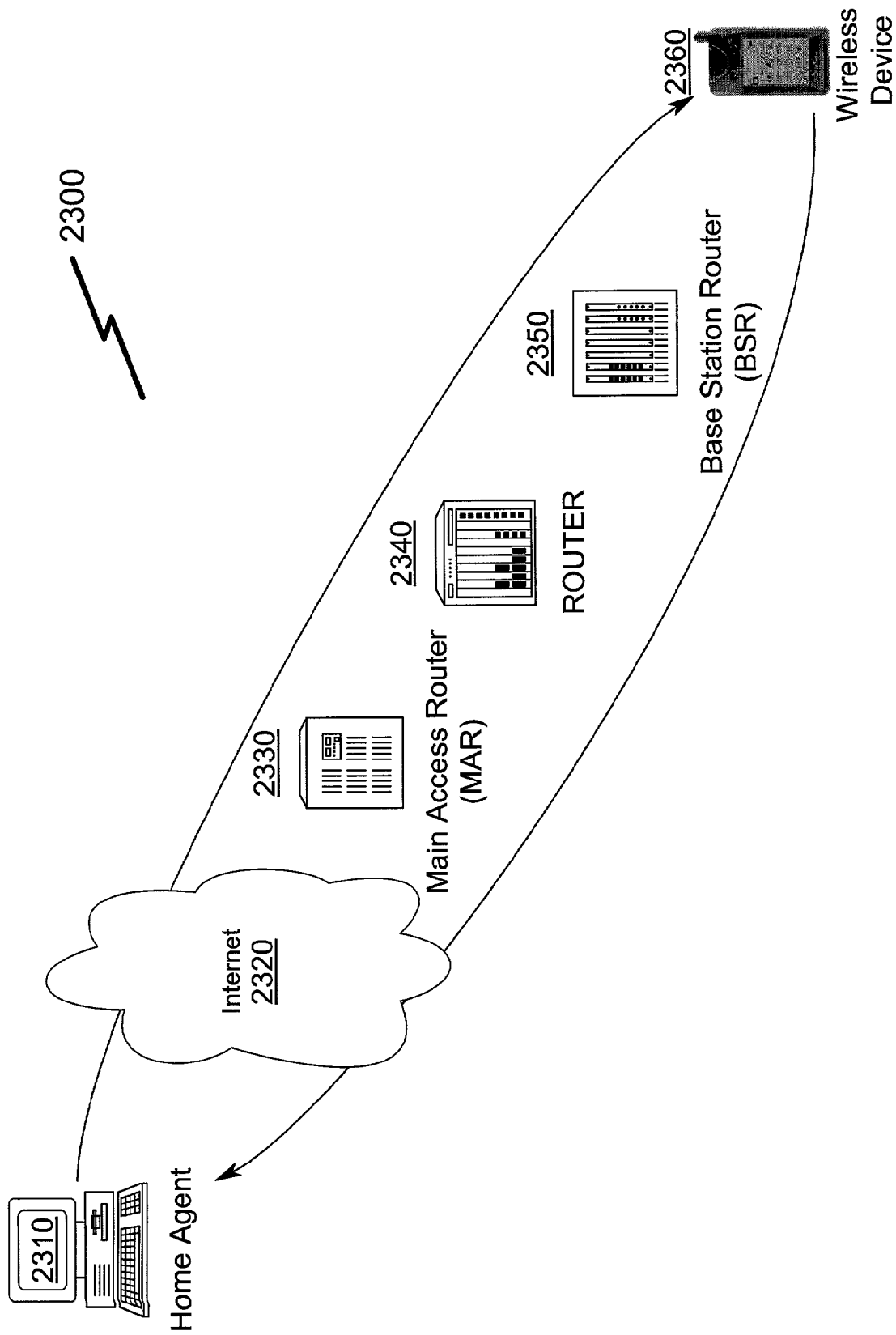
FIG. 23 illustrates a generic overview of the signal communications paths possible using the teachings of the present invention.

Within this context, the general signal flow diagram of FIG. 23 (2300) is applicable. Here, one home agent (2310) or other network device communicates through the Internet (2320) via a series of one or more Main Access Routers (2330), Routers (2340), and/or Base Station Routers (2350) to one or more wireless devices (2360).

As illustrated in FIG. 24 (2400), the signaling in this context corresponds to the present invention protocol as described previously, and may generally incorporates
  MN Paged Trigger signaling structure means (2401);
  New Paging Area Trigger signaling structure means (2402);
  New Paging Mode Trigger signaling structure means (2403);
  Dormant MN Reachable Trigger signaling structure means (2404); and/or
  Dormant MN Not Reachable Trigger signaling structure means (2405). One skilled in the art will realized that there may be additions and subtractions from this signaling list without loss of generality.

CONCLUSION

A network paging system and method implementing a Mobile IP protocol that allows transparent routing of IP datagrams sent by a Correspondent Node (CN) (any Internet node that wants to communicate with a Mobile Node) to a Mobile Node (MN) in the Internet has been disclosed. The IP paging protocol disclosed is an extension to Mobile IP to allow dormant mode operation permitting conservation of battery power when not receiving/sending IP datagrams. The disclosed technique permits a mobile node to alternate between dormant and active modes to conserve its power resources.

In the disclosed invention, the mobile node does not perform location updates as long as it is in dormant mode. In a preferred embodiment, the implement IP paging protocol is a Layer-3 protocol used to find the paging area, in which the MN is located and to alert MN to come out of dormant mode, whenever there is an incoming traffic. The present invention in some preferred embodiments defines a new paging protocol, which uses triggers from Layer-2 to gracefully bring down the Layer-3 interface. The disclosed IP paging protocol benefits from a link layer (Layer-2 or L2) triggers, which provide timely information to network layer (Layer-3 or L3) about the progress of events in Layer-2.

One preferred embodiment of the present invention provides for a Layer-2 API in C-language for IP paging. This API is presented in the form of callback functions but may be implemented in a wide variety of other means. Whenever a significant event takes place in Layer-2, upper layers are notified using triggers, which can be implemented using callback functions. Network and upper layer protocols can use these callbacks to fine tune Layer-3 protocols. Paging API defines callback functions for dormant mode related information, sent from Layer-2 to Layer-3. The disclosed API also defines a set of attributes that define static properties of the underlying network. Each Layer-2 technology may use this hierarchy to specify its properties and limitations.

Although a preferred embodiment of the present invention has been illustrated in the accompanying Drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A network paging method for enabling communications between a home agent and a wireless device over the Internet, said method comprising:
- triggering a mobile node (MN) when a paging request is received for said MN;
- triggering said MN when said MN changes Layer-2 paging area;
- triggering said MN when said MN changes mode;
- triggering an Access Router (AR) associated with said MN when Layer-2 state of said MN changes from an unreachable state to a reachable state;
- triggering said AR when Layer-2 state of said MN changes from said reachable state to said unreachable state; and
- wherein said triggering steps are performed via a communication over the Internet.

2. The method of claim 1 wherein said communication is maintained under supervision of a network paging protocol comprising;
- Layer-3 network address structures, wherein Layer-3 refers to the network layer in the OSI stack;
- Layer-2 network address structures; and
- Paging area ID structures;, wherein said structures augment conventional Mobile IP communication protocols to affect network paging functionality associated with said MN.

3. The method of claim 1 wherein said triggering when Layer-2 state of said MN changes from said unreachable state to said reachable state is sent to Layer-3 at said AR when said MN state in Layer-2 changes from said unreachable state to said reachable state.

4. The method of claim 1 wherein said triggering when Layer-2 state of said MN changes from said reachable state to said unreachable state is sent to Layer-3 at said AR when said MN state in Layer-2 changes from said reachable state to said unreachable state.

* * * * *